(12) United States Patent
Matsutsuka et al.

(10) Patent No.: US 8,738,735 B2
(45) Date of Patent: May 27, 2014

(54) SYSTEM FOR DESIGNING AND PERFORMING WEB APPLICATION

(75) Inventors: Takahide Matsutsuka, Kawasaki (JP); Yoshihide Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 961 days.

(21) Appl. No.: 12/790,214

(22) Filed: May 28, 2010

(65) Prior Publication Data

US 2010/0242016 A1 Sep. 23, 2010

Related U.S. Application Data

(62) Division of application No. 11/456,636, filed on Jul. 11, 2006, now Pat. No. 7,752,284, which is a division of application No. 09/797,868, filed on Mar. 5, 2001, now Pat. No. 7,099,958.

(30) Foreign Application Priority Data

Aug. 15, 2000 (JP) .................... 2000-246139
Nov. 15, 2000 (JP) .................... 2000-347977

(51) Int. Cl.
*G06F 13/00* (2006.01)
(52) U.S. Cl.
USPC ............................................. 709/219
(58) Field of Classification Search
USPC .................. 709/217, 219, 223, 225; 347/900
See application file for complete search history.

(56) References Cited

U.S. PATENT DOCUMENTS

| 5,930,512 | A | 7/1999 | Boden et al. |
| 6,343,265 | B1 | 1/2002 | Glebov et al. |
| 6,490,581 | B1 | 12/2002 | Neshatfar et al. |
| 6,507,856 | B1 | 1/2003 | Chen et al. |
| 6,597,366 | B1 | 7/2003 | Bennett et al. |
| 6,601,098 | B1 | 7/2003 | Case et al. |
| 6,633,914 | B1 | 10/2003 | Bayeh et al. |
| 6,651,108 | B2 | 11/2003 | Popp et al. |

(Continued)

FOREIGN PATENT DOCUMENTS

| JP | 6-168203 | 6/1994 |
| JP | 10-247202 | 9/1998 |

(Continued)

OTHER PUBLICATIONS

U.S. Office Action mailed Feb. 18, 2011 in corresponding U.S. Appl. No. 12/790,233.

(Continued)

*Primary Examiner* — Huan Tran
(74) *Attorney, Agent, or Firm* — Staas & Halsey LLP

(57) ABSTRACT

When an application server for performing a Web application is developed, a framework describing each of the modules of data, a logic, and a screen is provided. To attain this, the input contents of a Web page are converted into a data object, the combination of the type of the data object and a command is mapped in each process routine using a first foreign definition file, a process routine to be executed is determined from among prepared process logics based on the type of the data object, the command, and the first foreign definition file, and the combination of an execution result of the process logic and the type of the displaying data object is mapped in the displaying component using a second foreign definition file. These files are provided in the application server.

8 Claims, 49 Drawing Sheets

(56) References Cited

U.S. PATENT DOCUMENTS

| | | |
|---|---|---|
| 6,714,928 B1 | 3/2004 | Calow |
| 6,732,330 B1 | 5/2004 | Claussen et al. |
| 6,732,331 B1 | 5/2004 | Alexander |
| 6,792,605 B1 | 9/2004 | Roberts et al. |
| 6,792,607 B1 | 9/2004 | Burd et al. |
| 6,826,597 B1 | 11/2004 | Lonnroth et al. |
| 6,839,881 B2 | 1/2005 | Myers et al. |
| 6,851,088 B1 | 2/2005 | Conner et al. |
| 6,854,120 B1 | 2/2005 | Lo et al. |
| 6,938,203 B1 | 8/2005 | Dimarco et al. |
| 7,099,060 B2 * | 8/2006 | Nanjyo et al. ............. 359/198.1 |
| 7,099,958 B2 * | 8/2006 | Matsutsuka et al. .......... 709/246 |
| 7,404,177 B1 | 7/2008 | Greenfield et al. |
| 7,495,683 B2 * | 2/2009 | Takata et al. ................... 347/116 |
| 7,752,284 B2 * | 7/2010 | Matsutsuka et al. .......... 709/219 |

FOREIGN PATENT DOCUMENTS

| | | |
|---|---|---|
| JP | 8-249253 | 10/1999 |
| JP | 11-282658 | 10/1999 |
| JP | 11-296507 | 10/1999 |
| WO | WO 00/23925 | 4/2000 |

OTHER PUBLICATIONS

U.S. Notice of Allowance mailed May 3, 2011 in corresponding U.S. Appl. No. 12/790,233.

T. Matsuda et al., "Designing Frameworks for Business Application Software", pp. 15-16, Winter Workshop in Kochi, Jan. 21-22, 1999.

U.S. Appl. No. 11/456,636, filed Jul. 11, 2006, Takahide Matsutsuka, Fujitsu Limited.

Unassigned, May 28, 2010, Takahide Matsutsuka, Fujitsu Limited.

Japanese Notice of Rejection Grounds dated Oct. 24, 2006 in corresponding Japanese patent application No. 2001-241749.

Japanese Office Action issued in corresponding Japanese Patent Application No. 2006-344425, on Jul. 5, 2007.

Japanese Office Action, mailed Jul. 10, 2007 and issued in corresponding Japanese Patent Application No. 2007-070577.

Japanese Office Action, mailed May 27, 2008 and issued in corresponding Japanese Patent Application No. 2007-301883.

Restriction Requirement mailed Aug. 24, 2004 in corresponding U.S. Patent No. 7,099,958, issued Aug. 29, 2006.

Office Action mailed Jul. 4, 2005 in corresponding U.S. Patent No. 7,099,958, issued Aug. 29, 2006.

Interview Summary mailed Jun. 1, 2005 in corresponding U.S. Patent No. 7,099,958, issued Aug. 29, 2006.

Office Action mailed Jun. 1, 2005 in corresponding U.S. Patent No. 7,099,958, issued Aug. 29, 2006.

Advisory Action mailed Oct. 20, 2005 in corresponding U.S. Patent No. 7,099,958, issued Aug. 29, 2006.

Restriction Requirement mailed Nov. 23, 2005 in corresponding U.S. Patent No. 7,099,958, issued Aug. 29, 2006.

Office Action mailed Feb. 3, 2006 in corresponding U.S. Patent No. 7,099,958, issued Aug. 29, 2006.

Notice of Allowance mailed Aug. 9, 2006 in corresponding U.S. Patent No. 7,099,958, issued Aug. 29, 2006.

Office Action issued Oct. 23, 2009 in corresponding U.S. Appl. No. 11/456,636.

Notice of Allowance issued Feb. 26, 2010 in corresponding U.S. Appl. No. 11/456,636.

Restriction Requirement mailed Aug. 25, 2004 in corresponding U.S. Patent No. 7,099,958, issued Aug. 29, 2006.

Office Action mailed Jan. 4, 2005 in corresponding U.S. Patent No. 7,099,958, issued Aug. 29, 2006.

Notice of Allowance mailed May 9, 2006 in corresponding U.S. Patent No. 7,099,958, issued Aug. 29, 2006.

* cited by examiner

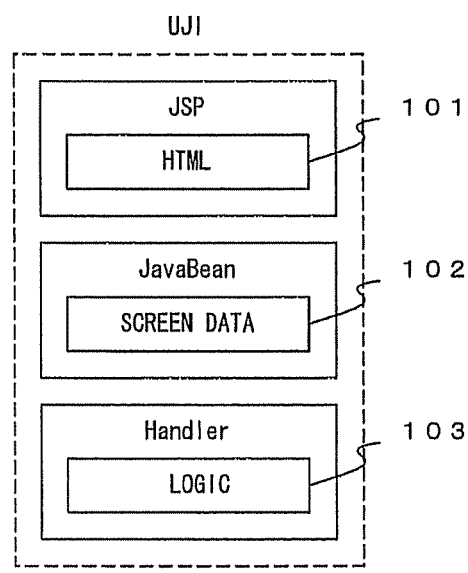
F I G. 4

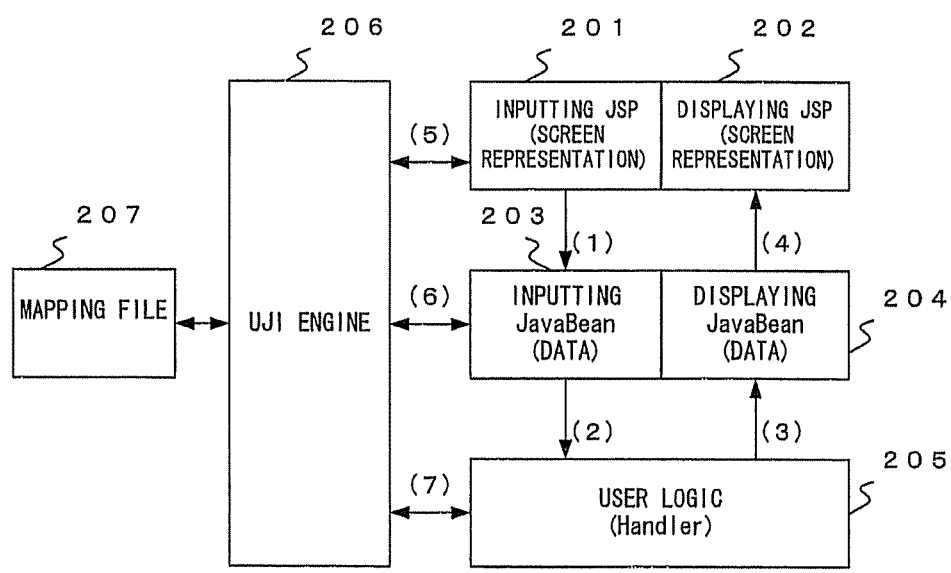
F I G. 5

DISPATCH FROM USER STATUS EDIT SCREEN

| INPUT DATA | COMMAND | PROCESS |
|---|---|---|
| USER STATUS | PROFILE EDIT | PROFILE CHANGING PROCESS |
| | LOGOUT | LOGOUT PROCESS |

F I G. 1 0 A

DISPATCH FROM USER STATUS EDIT SCREEN

| INPUT DATA | COMMAND | PROCESS |
|---|---|---|
| USER STATUS | CHANGE | USER STATUS CHANGING PROCESS |
| PROFILE EDIT | | PROFILE CHANGING PROCESS |

F I G. 1 0 B

DISPATCH FROM LOGIN PROCESS

| OUTPUT DATA | PROCESS RESULT | SCREEN |
|---|---|---|
| USER STATUS | SUCCESSFUL LOGIN | USER STATUS EDIT SCREEN |
| | UNSUCCESSFUL LOGIN | UNSUCCESSFUL LOGIN SCREEN |

F I G. 1 0 C

```
class   MySessionProfile extends SessionProfile implements SingleThread [
            . . . . . . . . . . . . .
            . . . . . . . . . . . . .
            . . . . . . . . . . . . .
        ]
```

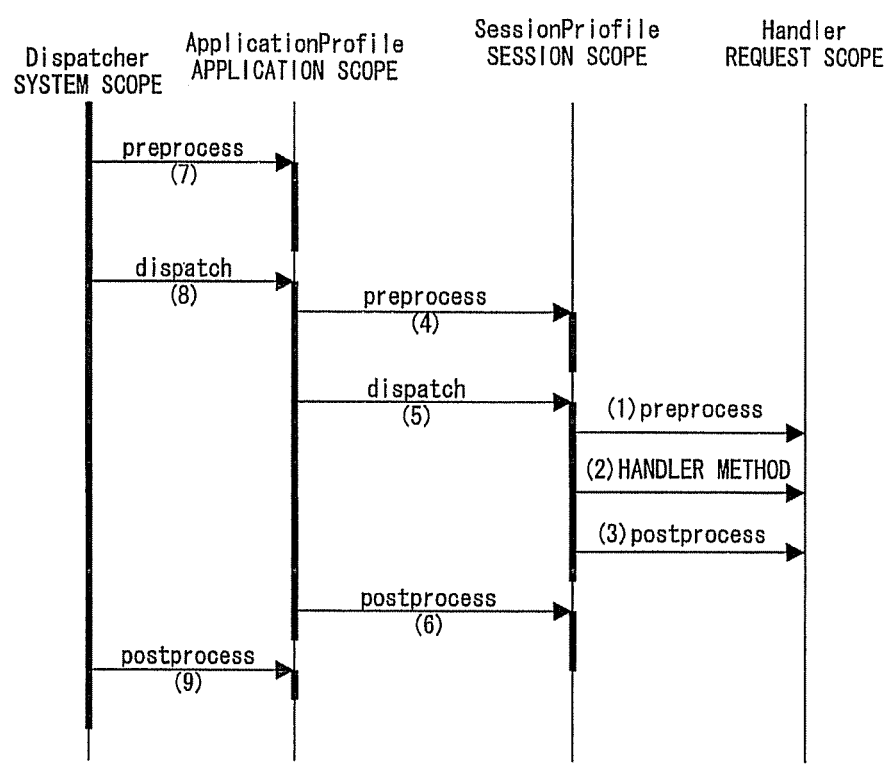
F I G. 2 4

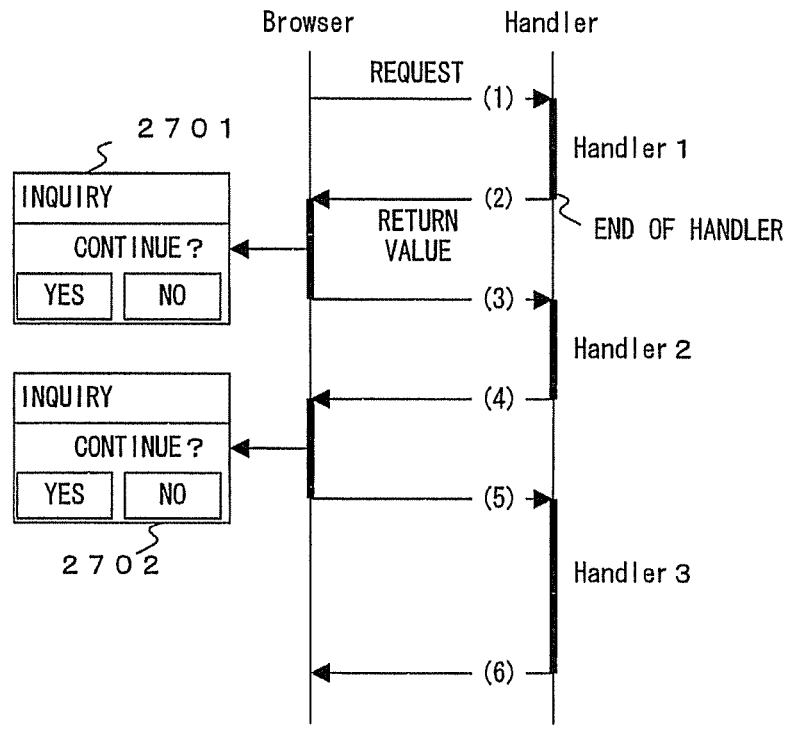

FIG. 25A

```
// ORIGINAL EVENT HANDLER
public void handler1(DispathContext context, Bean bean) {
  boolean succeed = ...;
  if (needAlert) {
    //ORIGINAL SCREEN SETTING
    // SETTING alert Bean
    return;
  }
  //SUCCESSFUL PROCESS
  // ...
}
//EVENT HANDLER FOR RETURN VALUE WHEN handler1 ISSUES ALERT
public void handler2(DispatchContext context, AlertBean bean) {
  boolean result = bean.getResult();
  if (result) {
    //....
  }
}
```

FIG. 25B

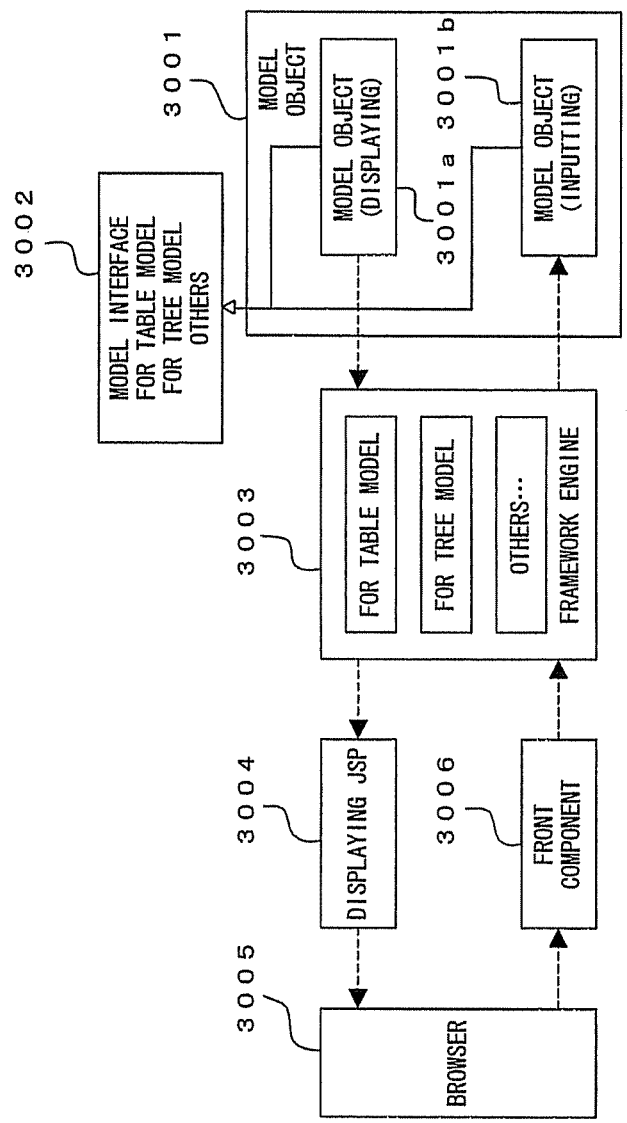
F I G. 27

```
public interface TableModel{
  public int getColumnCount();
  public int getRowCount();
  public Object getValueAt(int row , int col);
  public String getColumnClass(int row , int col);
  public String getRowClass(int row);
  public void setValueAt(Object value , int row , int col);
}
```

[UNIQUE ID OF VIEW] . [MODEL-UNIQUE POSITION]

NAMING RULE

FIG. 33B

" uji.model.00001.2_3 "

EXAMPLE OF NAMING ACCORDING TO RULE

FIG. 33C

" uji.model.0000.2_3.00002.1_2 "

EXAMPLE OF NAMING IN NESTED VIEW

```
<uomf:tableRenderer type="column" cls="editable">
 <td><input name="<uomf:name/>"
    value="<uomf:value/>"/></td>
</uomf:tableRenderer>
```

F I G. 3 4

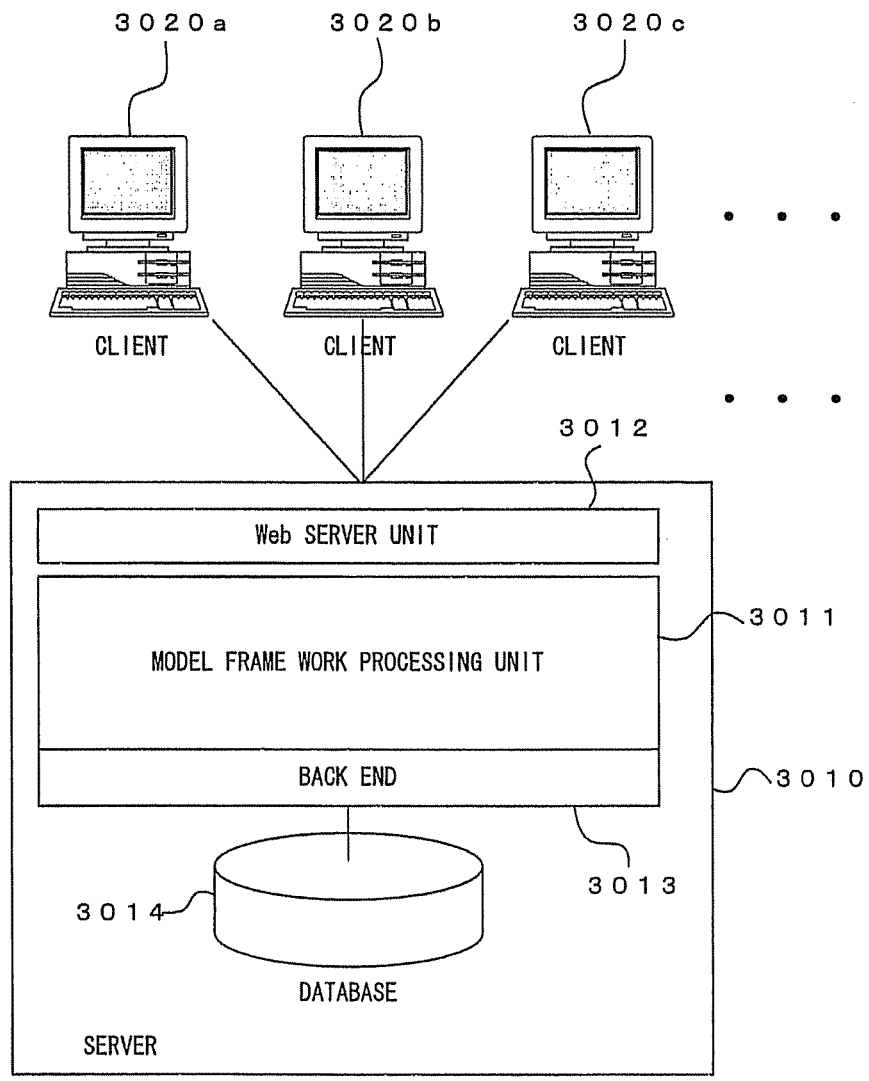
F I G. 3 8

(A) DESCRIPTION SENTENCE

```
01:<sf:form name="input">
02:<sf:input name="field1"/>
03:<sf:action event="click">
04:<alert("clicked!");
05:</sf:action>
06:</sf:input>
07:</sf:form>
```

→ CONTENTS CONVERTING PROCESS →

(B) GENERATED HTML SENTENCE

```
01:<script>
02:function action123(target) {
03:alert("clicked!");
04:return true;
05:}
06:</script>
07:<form name="input">
08:<input name="field1" onclick="return action123(this);"/>
09:</form>
```

F I G. 3 9

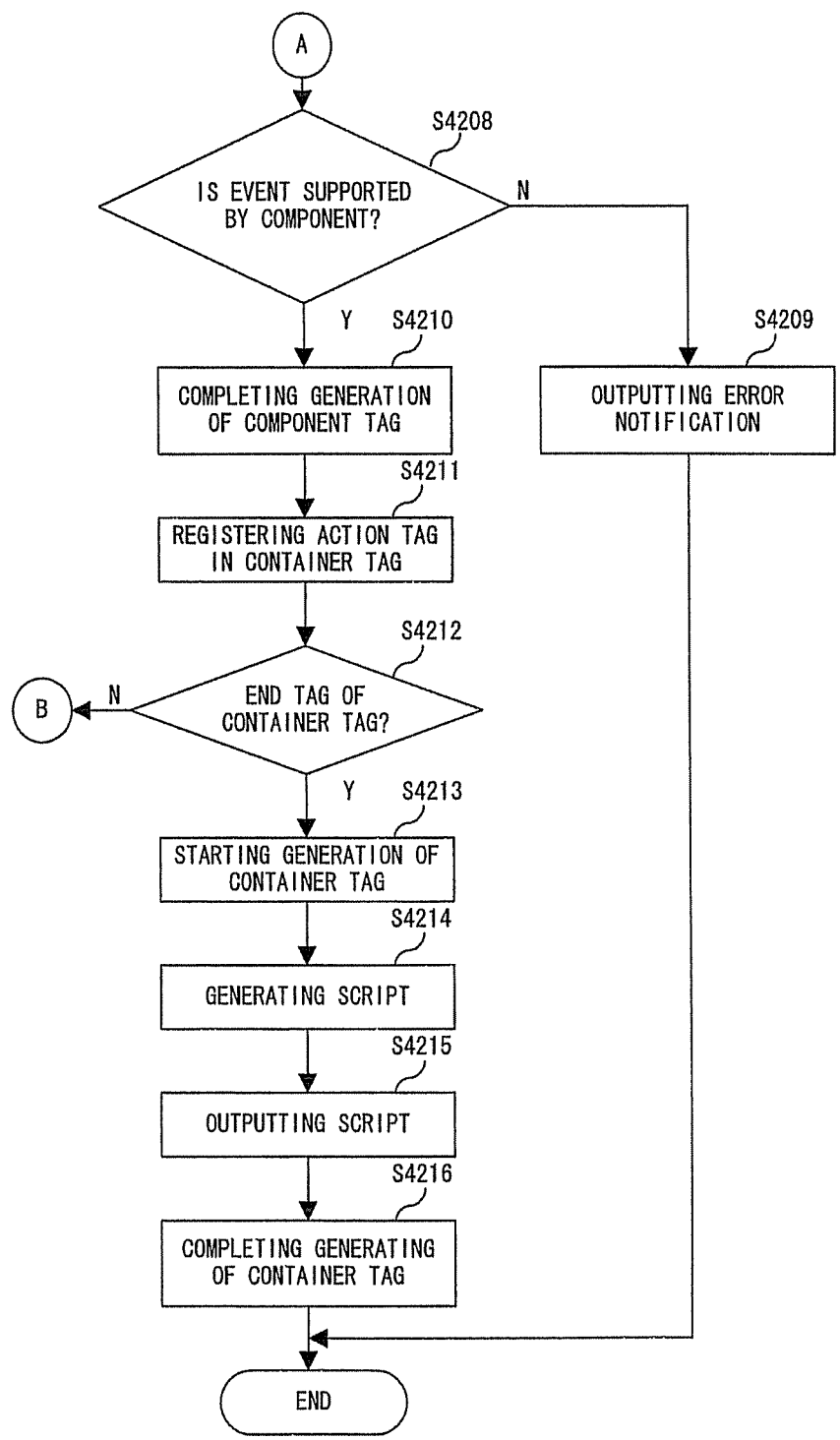
F I G. 4 3

```
public class MyActionTag extends CustomActionTag{ protected int min =0;

public void setMinLength(int min){
 this.min=min;
} public void outputFunctionBody(Writer writer){
 if(min>0){
   writer.write("if(target.value.length<"+min+"){¥n");
   writer.write("alert(¥"INPUT"+min+ "CHARACTERS OR MORE.¥");¥n");
   writer.write("return false;¥n");
   writer.write("}¥n");
  }
 }
}
```

F I G. 4 5

SYSTEM FOR DESIGNING AND PERFORMING WEB APPLICATION

CROSS REFERENCE TO RELATED APPLICATION

This application is a Divisional of U.S. patent application Ser. No. 11/456,636, filed Jul. 11, 2006, which is a Divisional of U.S. patent application Ser. No. 09/797,868, filed Mar. 5, 2001, (now U.S. Pat. No. 7,099,060), which claims priority to Japanese Application No. 2000-246139, filed Aug. 15, 2000 and Japanese Application No. 2000-347977, filed Nov. 15, 2000, the entire contents of all of which are incorporated by reference herein.

BACKGROUND OF THE INVENTION

1. Field of the Invention

The present invention relates to the technology of improving the efficiency and maintenance in developing business application software for processing a key job of a company.

2. Description of the Related Art

In a business application such as a data entry system, work flow system, etc., the data managed by a database server 12 is manipulated by a client 13 through an application server 11 shown in FIG. 1. Recently, these business applications have been realized as Web applications.

Conventionally, various attempts have been made to develop the application server 11 for controlling a Web browser. A typical example is the application server 11 using Servlet and JSP (Java Server Pages).

The application server 11 using Servlet is realized by describing an HTML (HyperText Markup Language) 21 for prescription of a screen display, screen data 22, a logic 23 (handling an input on a screen, checking input data, processing data, transmitting data to the database server 12, etc.) as one module as shown in FIG. 2.

In addition, as shown in FIG. 3, the application server 11 using the JSP can be realized by describing screen data 32 stored in an object named Java Bean (Java and Java Beans are registered trademarks of Sun Microsystems Incorporated) and a module including an HTML 31 and a logic 33, or describing a module including an HTML 31' and a Java Bean object storing screen data 32' and logic 33'.

Since a large volume of data is normally processed in a business application, the application server 11 is realized by describing data (screen data), a logic, a screen (HTML, etc.) separately in a module unit at a request to re-use each module. However, as shown in FIGS. 2 and 3, it has been difficult to separate these modules in the application server 11 according to the conventional technology such as the Servlet, the JSP, etc.

SUMMARY OF THE INVENTION

To solve the above mentioned problems, the present invention aims at improving the development efficiency and the maintenance of a Web application by providing a framework capable of separately describing data, a logic, a screen in a module unit when an application server for executing a Web application is to be developed.

To attain the above mentioned object, the present invention divides a Web application into an HTML with a custom tag, a data object, and a logic, performs a mapping process between the HTML with the custom tag and the logic using a mapping file, and uses a data object for transmission and reception of data between them.

According to an aspect of the present invention, the system includes: an input contents conversion unit for converting the input contents of a Web page into a data object; a process logic including a plurality of process routines; a first foreign definition file for mapping the combination of the type of the data object and a command on each of the plurality of process routines; a process routine determination unit for determining a process routine to be performed among the process routines in the process logic according to the type of the data object and the command, and the first foreign definition file; and a second foreign definition file for mapping the combination of the process result of the process logic and the type of the data object on a display component.

According to another aspect of the present invention, the system includes: a data object obtaining unit having data to be provided for a client and obtaining a data object indicating the data structure of the data for installing an interface; a unit for obtaining a definition statement for defining a method of displaying data of the data object on a Web page screen; and a unit for generating a document expressing a Web page screen on which the data is displayed by associating the data of the data object with the definition statement based on the interface installed in the data object.

According to a further aspect of the present invention, the system includes: a unit for generating a character string which is a process logic by which the contents of a process is defined, and indicates the name of the predetermined process logic; and a unit for generating a document for invoking the process logic using the character string and having the client perform the process of invoking and performing the process logic when an event matching a predetermined performing condition of the process logic occurs.

With the configuration, the association among the document data prescribing the screen display, the data object, and the logic prescribing the contents of the process becomes loose, thereby improving the development efficiency and the maintenance.

BRIEF DESCRIPTION OF THE DRAWINGS

The present invention will be more apparent from the following detailed description when the accompanying drawings are referenced.

FIG. 4 shows the outline of the present invention;

FIG. 5 shows the configuration according to the principle of the present invention;

FIG. 10A shows the first example of a command mapping;

FIG. 10B shows the second example of a command mapping;

FIG. 10C shows an example of a page mapping;

FIG. 24 shows the sequence when a request of a client is processed;

FIG. 25A shows the system of making a call back from the handler of a logic to a browser in a common application server;

FIG. 25B shows an example of a description of a program for using the system of making a call back from the handler of a logic to a browser in a common application server;

FIG. 27 shows the configuration of the system according to the third embodiment of the present invention;

FIG. 28 shows an example of declaring a table model interface;

FIGS. 33A, 33B, and 33C show renderer element tags of <name>;

FIG. 34 shows an example of defining a renderer using a renderer element tag of <name>;

FIG. 38 shows an example of a client/server system according to a third embodiment of the present invention;

FIG. 39 shows the system of generating an HTML sentence according to a fourth embodiment of the present invention;

FIG. 43 is a flowchart (2) of the contents of the converting process;

FIG. 45 shows an example of defining a process script for checking the smallest number of characters in a character string;

DESCRIPTION OF THE PREFERRED EMBODIMENTS

Figure 1:
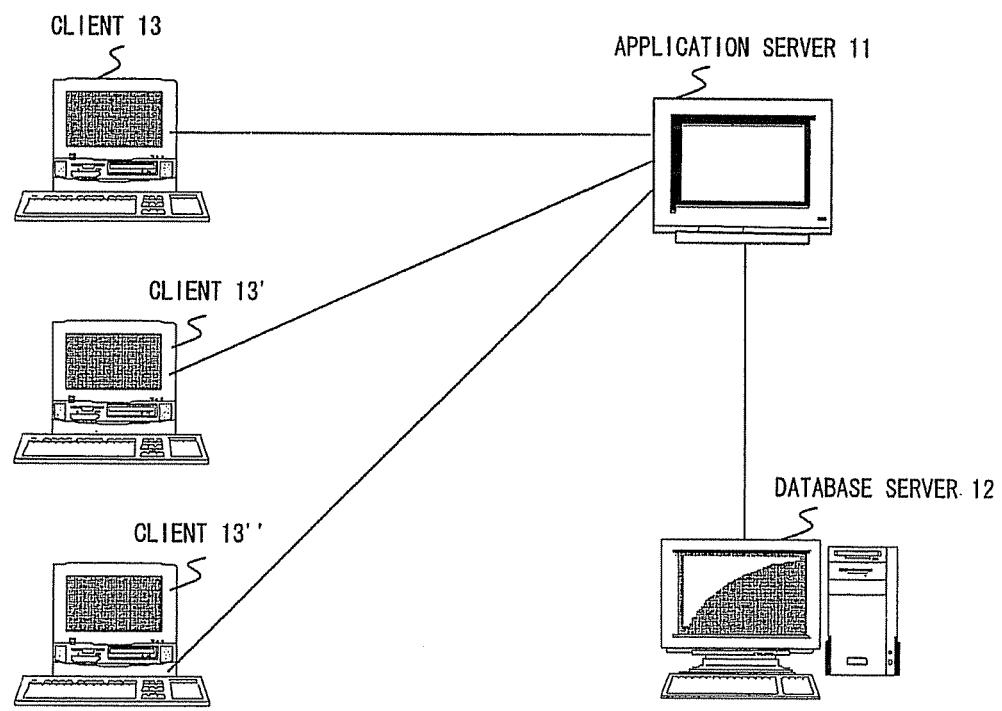
FIG. 1 shows an embodiment of a business application.
Figure 2:
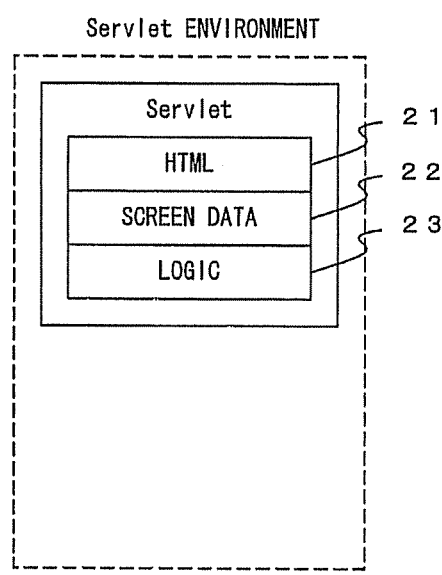
FIG. 2 shows the configuration of the system of an application server using Servlet.
Figure 3:
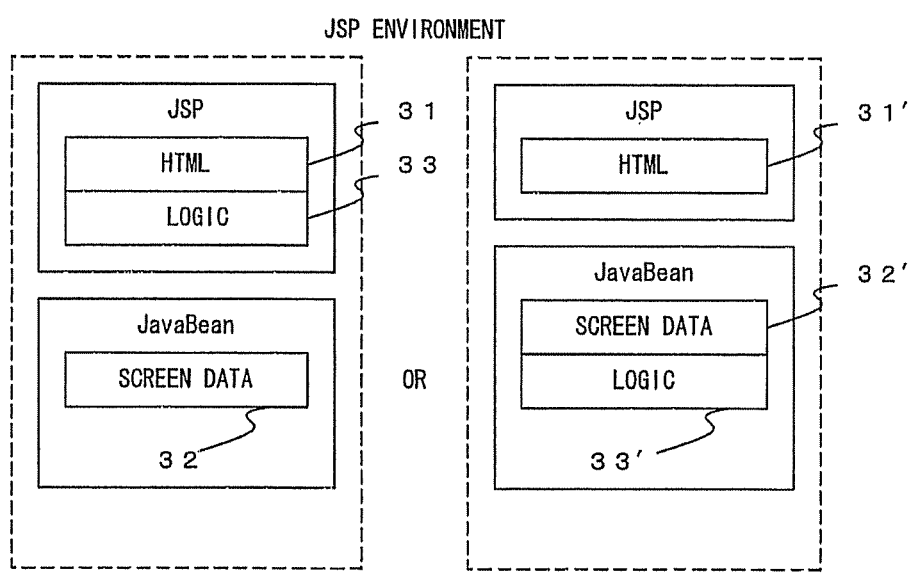
FIG. 3 shows the configuration of the system of an application server using the JSP.

FIG. 4 shows the outline of the present invention. An application server which is UJI for embodying the present invention comprises three modules, that is, an HTML 101 for prescribing a screen display, a screen data 102, and a logic 103. Any HTML 101 can be acceptable if it can prescribe a screen display.

FIG. 5 shows the configuration according to the principle of the present invention. An inputting JSP 201 and a displaying JSP 202 correspond to the HTML 101 shown in FIG. 4. An inputting Java Bean 203 and a displaying Java Bean 204 correspond to a screen data 102 shown in FIG. 4. A user logic 205 corresponds to a logic 103 shown in FIG. 4. The inputting JSP 201 has the function of assigning a screen to data. The displaying JSP 202 has the function of displaying data on the screen. A UJI engine 206 converts the screen data of the inputting JSP 201 into a data object such as, Java Bean, etc. ((1), (5), (6)). That is, the screen data of the inputting JSP 201 is converted into the inputting Java Bean 203. The user logic 205 comprises a plurality of process routines. The UJI engine 206 determines an appropriate process routine based on the type of the data object (inputting Java Bean 203), a command, and a foreign mapping file 207 ((5), (6), (7)). The user logic 205 processes the inputting Java Bean 203 which is a data object using the determined process routine ((2)), and outputs it as the displaying Java Bean 204 ((3)). The displaying Java Bean 204 is converted by the UJI engine 206 into the screen data for the displaying JSP 202 ((4), (5), (6)). The displaying Java Bean 204 retrieves the combination of the process result and the type of the displaying Java Bean which is a data object from the mapping file 207, and determines the component parts to be displayed on the screen. Thus, the present invention has the configuration in which a data object exists between an HTML prescribing the screen and a logic, thereby loosely connecting the screen to the logic.

Figure 6:
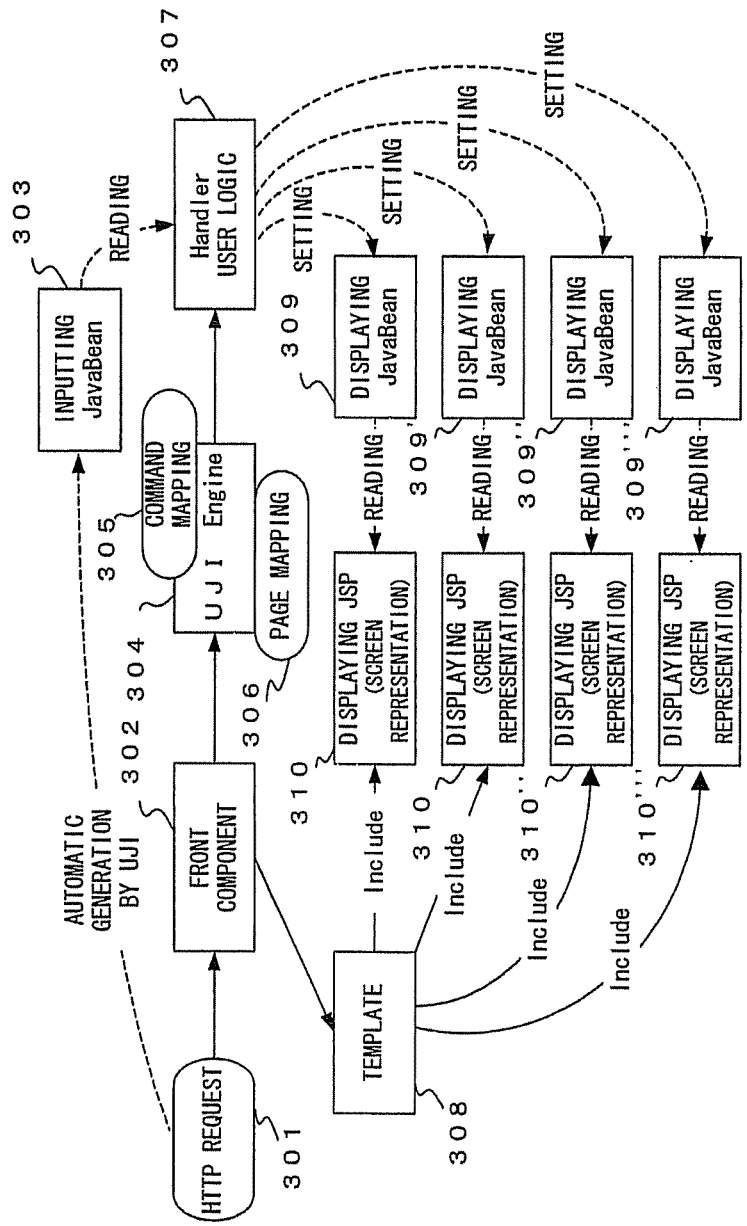
FIG. 6 shows the configuration of the system according to the first embodiment of the present invention.

FIG. 6 shows the configuration of the system according to the first embodiment of the present invention. A request 301 from a client is received by a front component 302. The request data contained in the request 301 is automatically analyzed by a UJI engine 304, and inputting Java Bean 303 which is a data object is automatically generated. The UJI engine 304 refers to a command mapping 305, and determines the process in a user logic 307 based on the type of the data object generated from the request data and a command. The user logic 307 reads the generated data object, performs a process depending on the determination, and sets displaying Java Bean 309 as a process result. The UJI engine 304 refers to a page mapping 306, and determines a displaying JSP 310, that is, a screen representation, from the displaying Java Bean 309. The displaying JSP 310 includes a template 308 for prescription of a page layout, and display parts are arranged based on the template 308.

Figure 7:
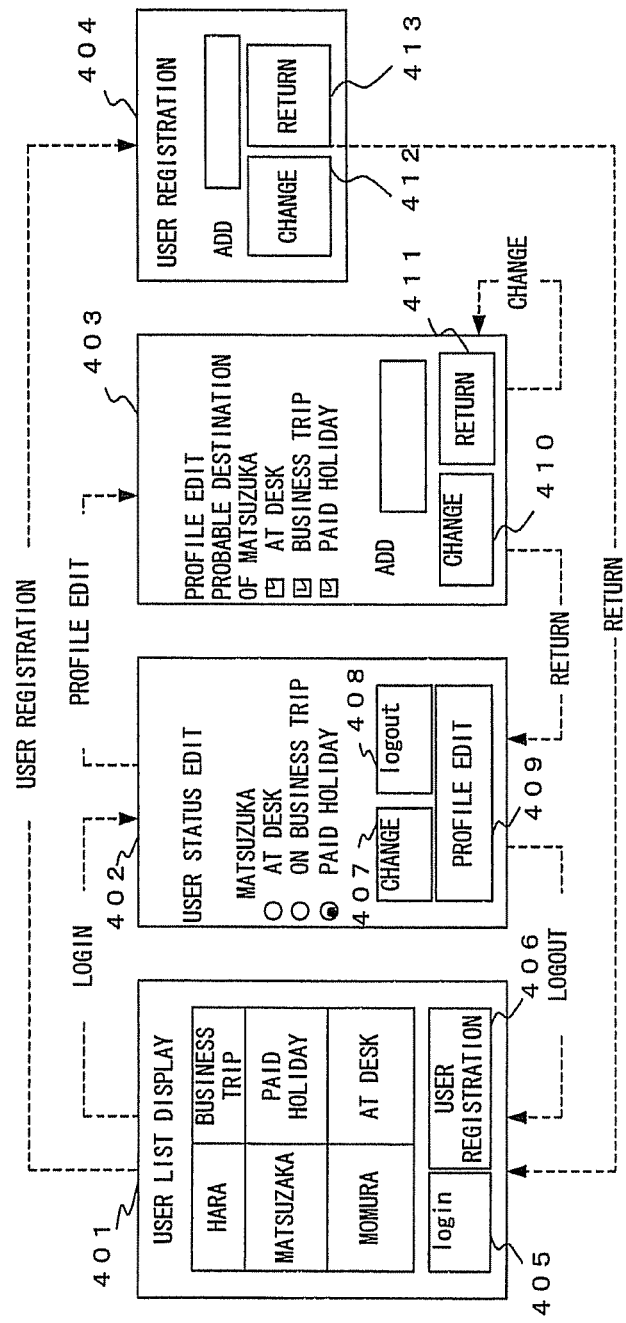
FIG. 7 shows the practical operation of the system according to the first embodiment of the present invention.

FIG. 6 shows the configuration of the system according to the first embodiment of the present invention, and shows the outline of the operations. The practical operations of the system according to the first embodiment of the present invention are described below by referring to FIG. 7. FIG. 7 shows the Web application names 'destination notice board' indicating where the user is. A user list display screen 401 displaying a list of users, a user status edit screen 402 for edit of the status of users, a profile edit screen 403 for edit of probable destinations of a user, and a user registration screen 404 for registration of a new user are displayed of the client system by the Web browser. If a login button 405 is pressed (clicked) when the user list display screen 401 is displayed, then the screen is switched into the user Status edit screen 402. If a user registration button 406 is pressed when the user list display screen 401 is displayed, then the screen is switched into the user registration screen 404. Similarly, if each button on each of the screens 402 through 404 is pressed, then the screen is switched as indicated by the arrow shown in FIG. 7. At this time, each of the login button 405, the user registration button 406, a change button 407, a logout button 408, etc. corresponds to a command to request the system to perform a process.

In addition, when a user 'Matsuzuka' requests to add the status 'meeting room' in addition to the three statuses 'working at his or her own desk', 'on business trip', and 'paid holiday', a profile edit button 409 is pressed on the user status edit screen 402. Then, the screen display is switched into the profile edit screen 403. If the user inputs, for example, 'meeting room' in the column 'addition', and presses a change button 410, then a profile edit screen is displayed with a new status added.

Figure 8:
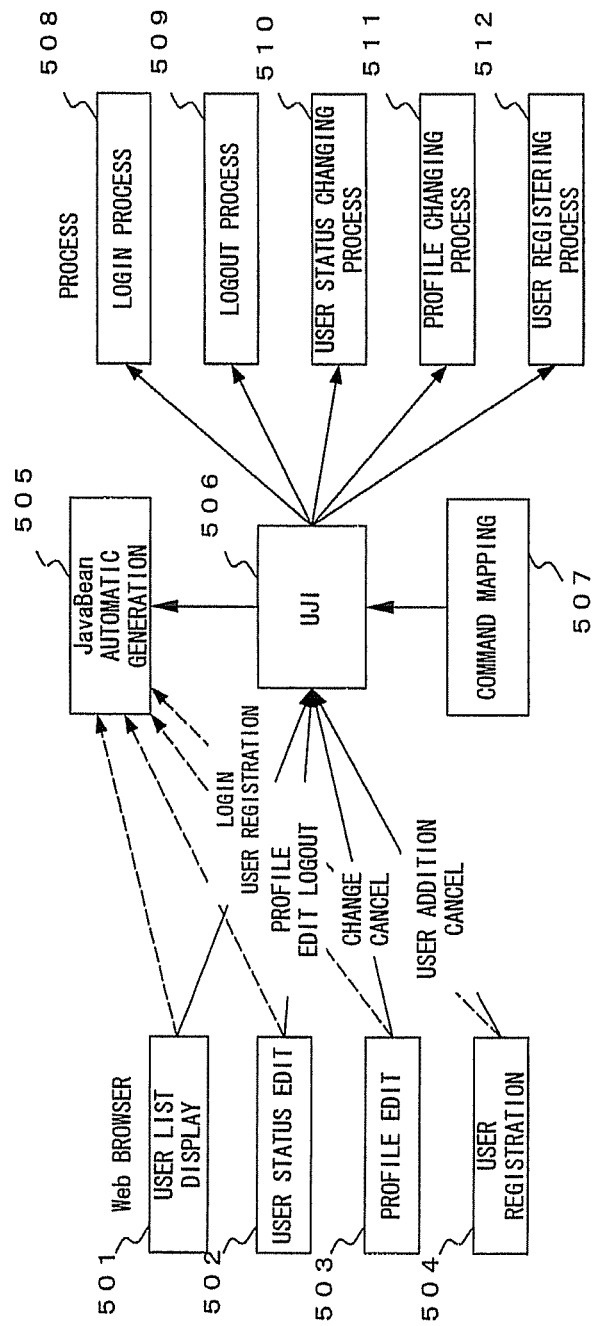
FIG. 8 shows the outline of the configuration and the operation (from receiving a request from a client to processing it) of the system of the application shown in FIG. 7.
Figure 9:
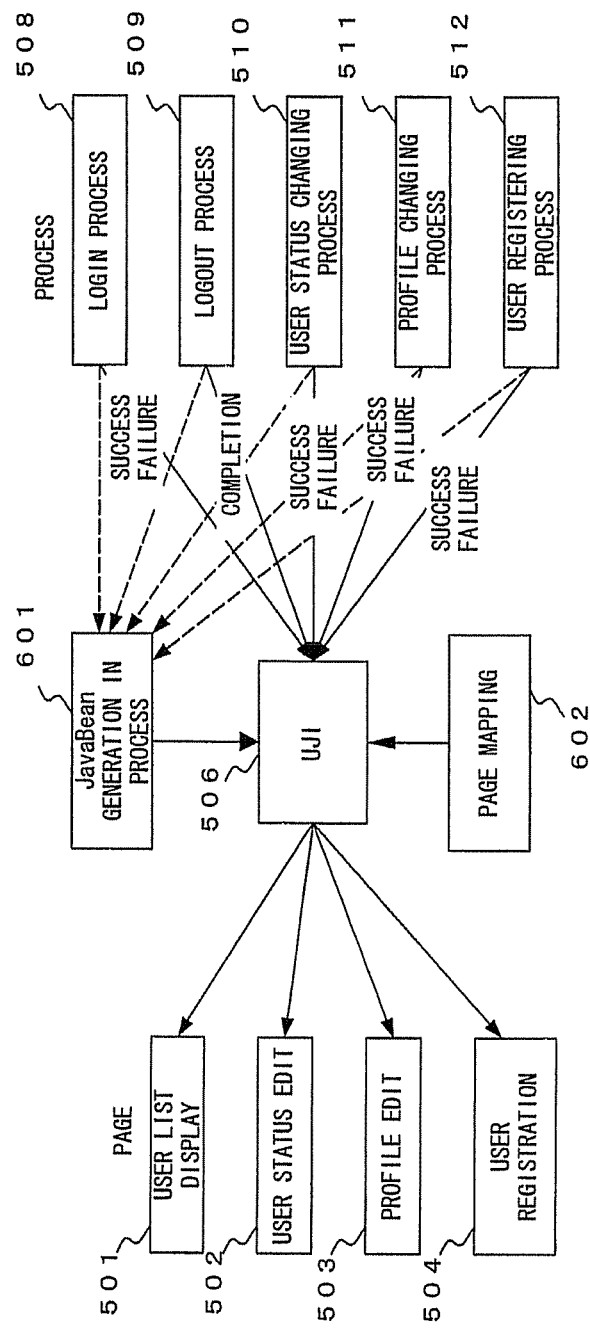
FIG. 9 shows the outline of the configuration and the operation (up to returning a response to a client) of the system of the application shown in FIG. 7.

FIGS. 8 and 9 shows the configuration of the system of the application shown in FIG. 7 and the outline of the operations.

FIG. 8 shows the outline of the operations from the reception of a request from a client to the completion of the process. A user list display screen 501, a user status edit screen 502, a profile edit screen 503, and user registration screen 504 displayed on the Web browser correspond to the respective screens shown in FIG. 7. When commands such as login, user registration, profile edit, logout, change, user addition, cancel, etc. are transmitted on each of the screens to a UJI 506 (indicated by an arrow in solid lines), each screen data is automatically converted into Java Bean 505 which is a data object (indicated by an arrow in broken lines). The UJI 506 refers to a command mapping 507 (described later), and selects a process to be dispatched to based on the combination of the transmitted command and the type of the data object from among the processes 508 through 512. Then, it passes the data object to the selected process. When the data object is passed, the data object is processed based on the contents of the selected process.

FIG. 9 shows the outline of the operations performed after the process of the data object is completed until a response is returned to the client. When each process is completed, Java bean 601 is generated as a process result. The UJI 506 refers to a page mapping 602 (described later), and a page to be displayed based on the combination of the process result (success, failure, completion, etc.) and the generated Java bean 601 is determined from among the pages 501 through 504. The Java bean 601 is passed to the page to be displayed, and a new page is displayed based on it.

FIGS. 10A and 10B show an example of a command mapping, and FIG. 10C shows an example of a page mapping. The command mapping comprises a table containing the information about the type of input data object, the type of command, and a process to be performed. The page mapping comprises a table containing the information about the type of output data object, a process result, and a screen to be displayed.

As shown in FIGS. 10A and 10B, a process to be dispatched to can be determined by the combination of the type of input data object and a command. FIG. 10A shows the command mapping when the types of input data objects are the same, and the types of commands are different. In FIG. 10A, when the type of input data object is 'user status', and the type of command is 'profile edit', it is determined that the process is dispatched to the profile changing process. FIG. 10B shows the command mapping when the types of input data objects are different, and the types of commands are the same. As shown in FIG. 7, a 'change' command is used on various screens. However, although the commands are the same, the processes to be dispatched to when commands are issued are different. If a 'change' command is issued on the user status edit screen 402 shown in FIG. 7, then the process is to be dispatched to the user status changing process. If a 'change' command is issued on the profile edit screen 403, then the process is to be dispatched to the profile changing process. In the command mapping shown in FIG. 10B, the process is dispatched to the user status changing process when the type of input data object is 'user status' and a 'change' command is issued. If the type of input data object is 'profile edit', and a 'change' command is issued, then it is prescribed that the process is dispatched to the profile editing process. Since a process to be dispatched to is determined based on the combination of the type of input data object and a command according to the command mapping of the present invention, the process to be dispatched to can be appropriately selected from the type of input data object although the commands are the same.

Additionally, by referring to the page mapping shown in FIG. 10C, a screen to be displayed can be determined by the combination of the type of output data object and a process result. Also in the page mapping, as in the command mapping, the screen can be determined by the combination of the type of output data object and a process result. Therefore, although process results are the same, a screen to be displayed can be appropriately selected from the type of output data object.

The command mapping and the page mapping are foreign definition files, and can be freely designed by a developer. With the configuration, the development flexibility can be efficiently improved.

The operations of the entire system according to the first embodiment of the present invention have been described above. The correlation among the operations is practically described below.

Figure 11:
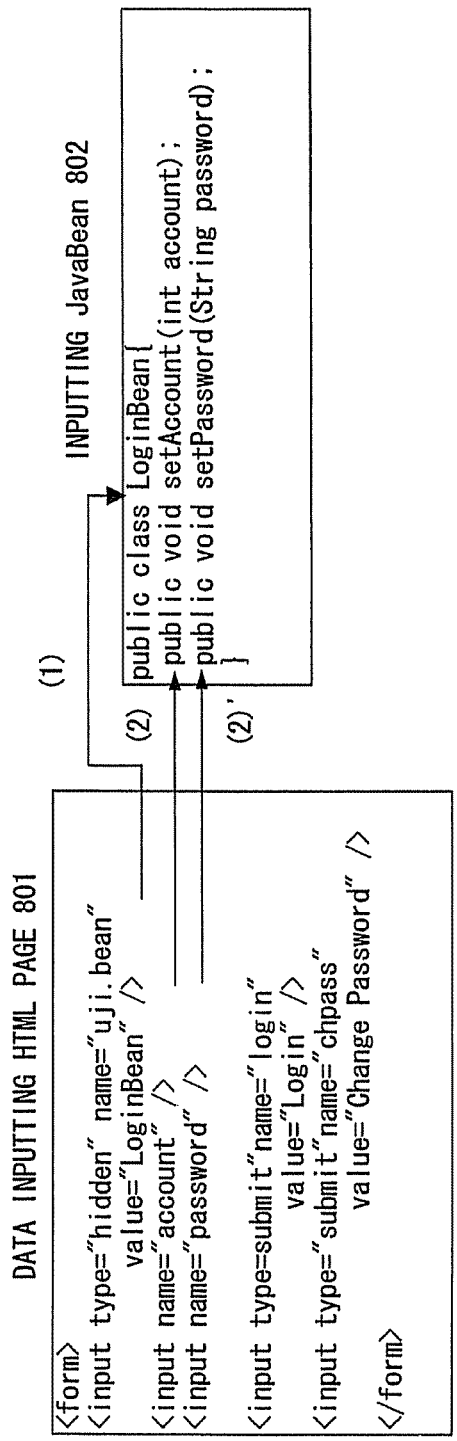
FIG. 11 shows the description portion for conversion of the request data from a client into inputting Java Bean in the description examples of a program on the data input HTML page.

FIG. 11 shows the description portion for conversion of the request data from a client in the examples of the program descriptions on the data inputting HTML page into inputting Java Bean (between 301 and 303 shown in FIG. 6). By the description, when data is input to a data inputting HTML page 801, a data object inputting Java Bean 802 having the class name ((1) shown in FIG. 11) corresponding to the specific item (LoginBean) of the data inputting HTML page 801 and the name of each input column as the property ((2) and (2)' shown in FIG. 11) is generated.

Figure 12:
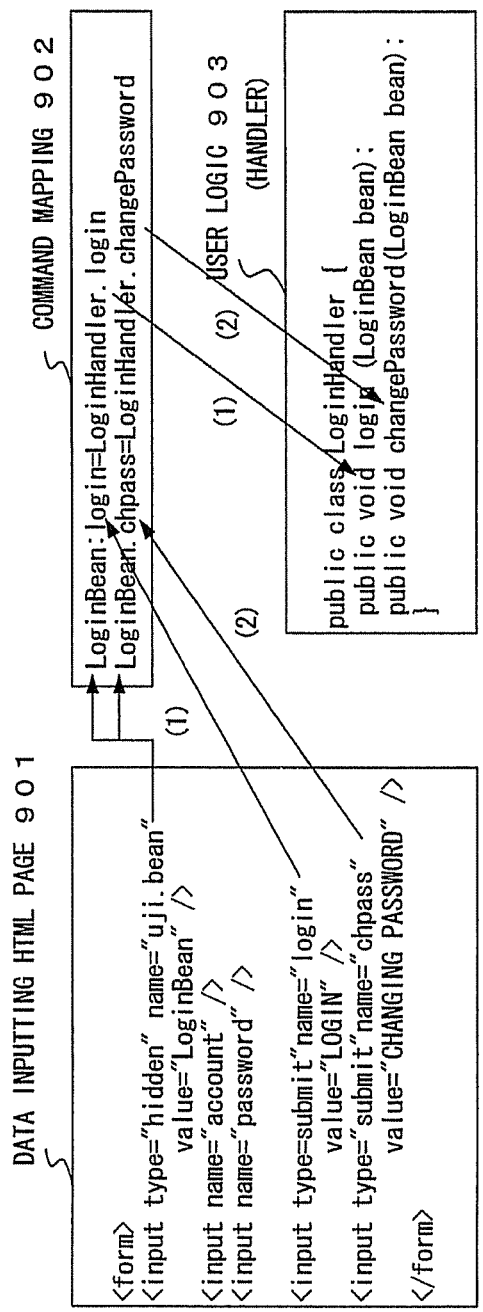
FIG. 12 shows an example of a description of the program description portion for determination of the process of a logic to be performed through a command mapping.

FIG. 12 shows an example of the description of the program description portion for determination (between 305 and 307 shown in FIG. 6) of the process of a logic to be executed using the command mapping. In a command mapping 902, the combination of the class name (LoginBean) corresponding to the specific item of a data inputting HTML 901 and the name of a pressed button (submit) is mapped as a method of a user logic 903 (handler). Thus, for example, when a login button is pressed on the data inputting HTML page 901, the login method of the user logic 903 is executed ((1) shown in FIG. 12). Similarly, when a password change button is pressed on the data inputting HTML page 901, the changePassword method of the user logic 903 is used ((2) shown in FIG. 12).

Figure 13:
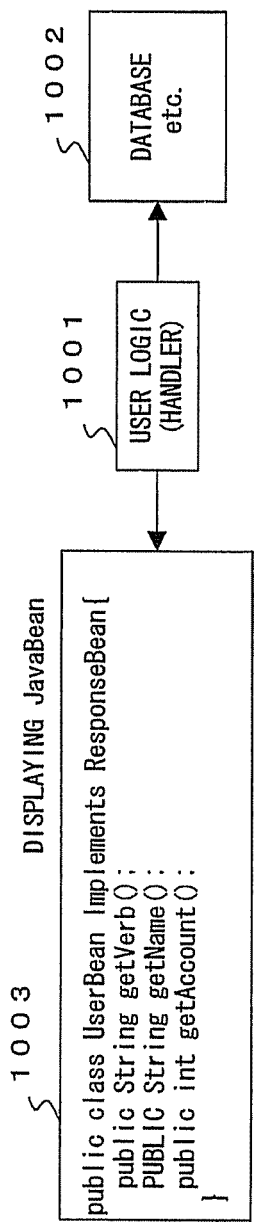
FIG. 13 shows the description portion for a user logic setting a displaying data object in the program descriptions of displaying Java Bean.

FIG. 13 shows the description portion for setting (between 307 and 309 shown in FIG. 6) a displaying data object for the user logic in the examples of program descriptions of the displaying Java Bean. A user logic (handler) 1001 performs a process using a database 1002, etc., and sets a process result and the value for which the process result is to be displayed as a displaying data object (Java Bean) 1003.

Figure 14:
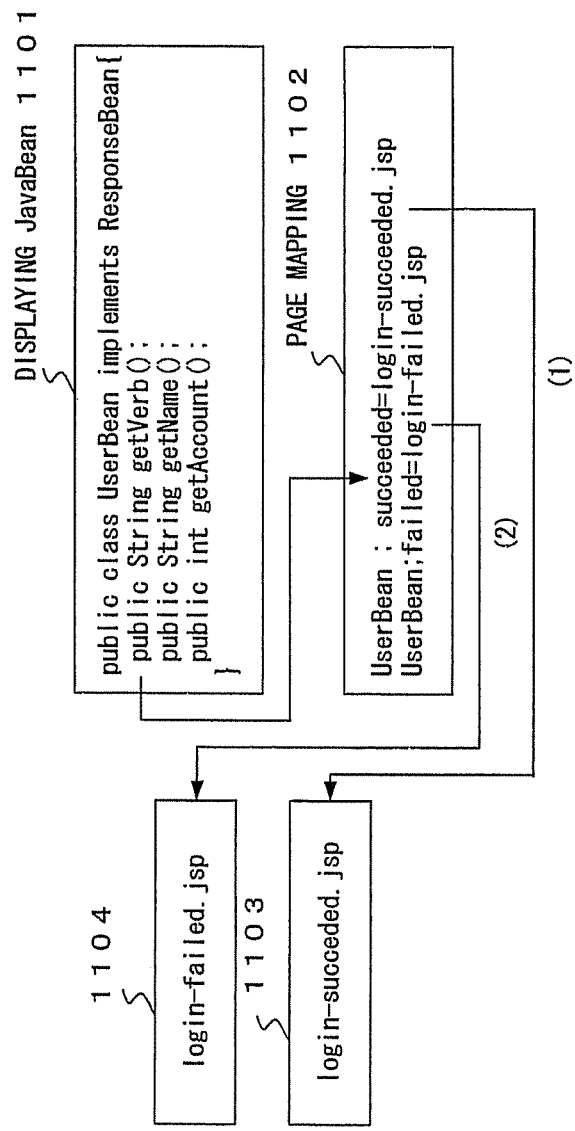
FIG. 14 shows an example of a description of a program description portion for determination of a page to be displayed through a page mapping.

FIG. 14 shows an example of a description of the program description portion for determination (between 309 and 310 shown in FIG. 6) of a page to be displayed through a page mapping. In a page mapping 1102, the combination of a process result set by a class name (UserBean) and a user logic (handler) is mapped to the view to be displayed (the JSP in this case). Thus, when the process result set for a displaying Java Bean 1101 is, for example, succeeded, a login-succeeded.jsp 1103 is selected ((1) shown in FIG. 14), and is combined with the template 308 shown in FIG. 6 to determine a display screen. Similarly, when the process result set for the displaying Java Bean 1101 is failed, a login-failed.jsp 1104 is selected ((2) shown in FIG. 14), and is combined with the template 308 shown in FIG. 6 to determine a display screen.

Figure 15:
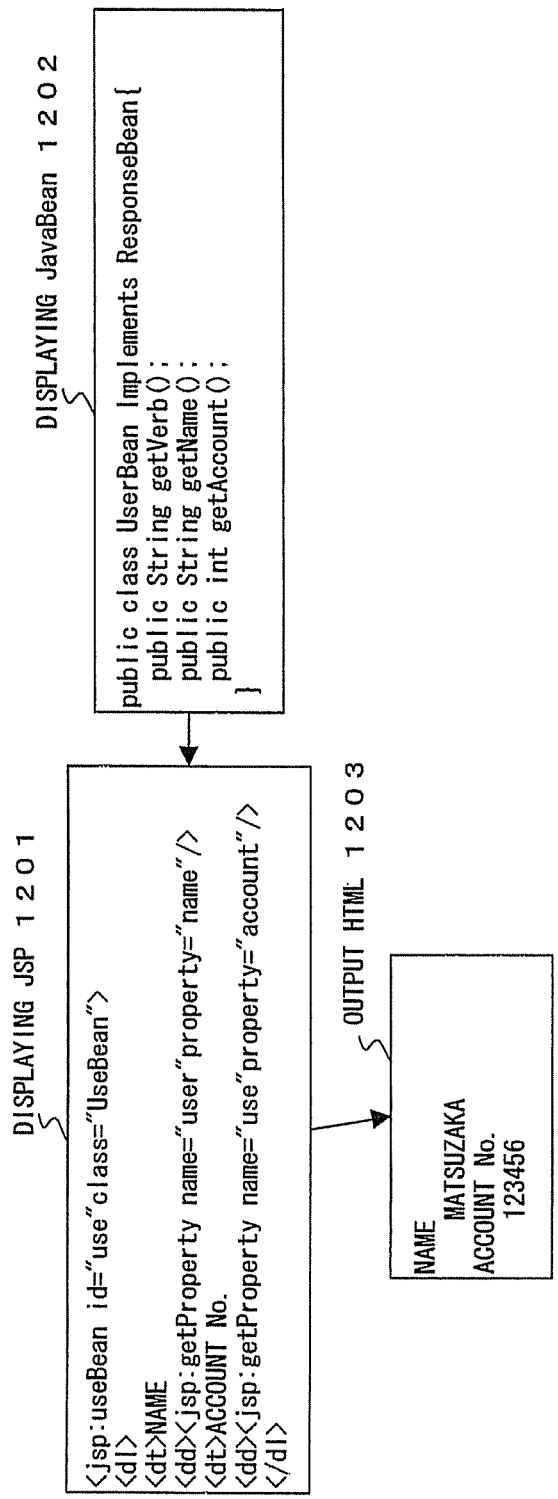
FIG. 15 shows an example of a description of a program description portion for output of a display screen from the JSP.

FIG. 15 shows an example of a description of the program portion for output (310 shown in FIG. 6) of a display screen from the JSP. A displaying JSP 1201 obtains data from displaying Java Bean 1202 using a data obtaining tag, and outputs the obtained data as an output HTML 1203.

Figure 16:
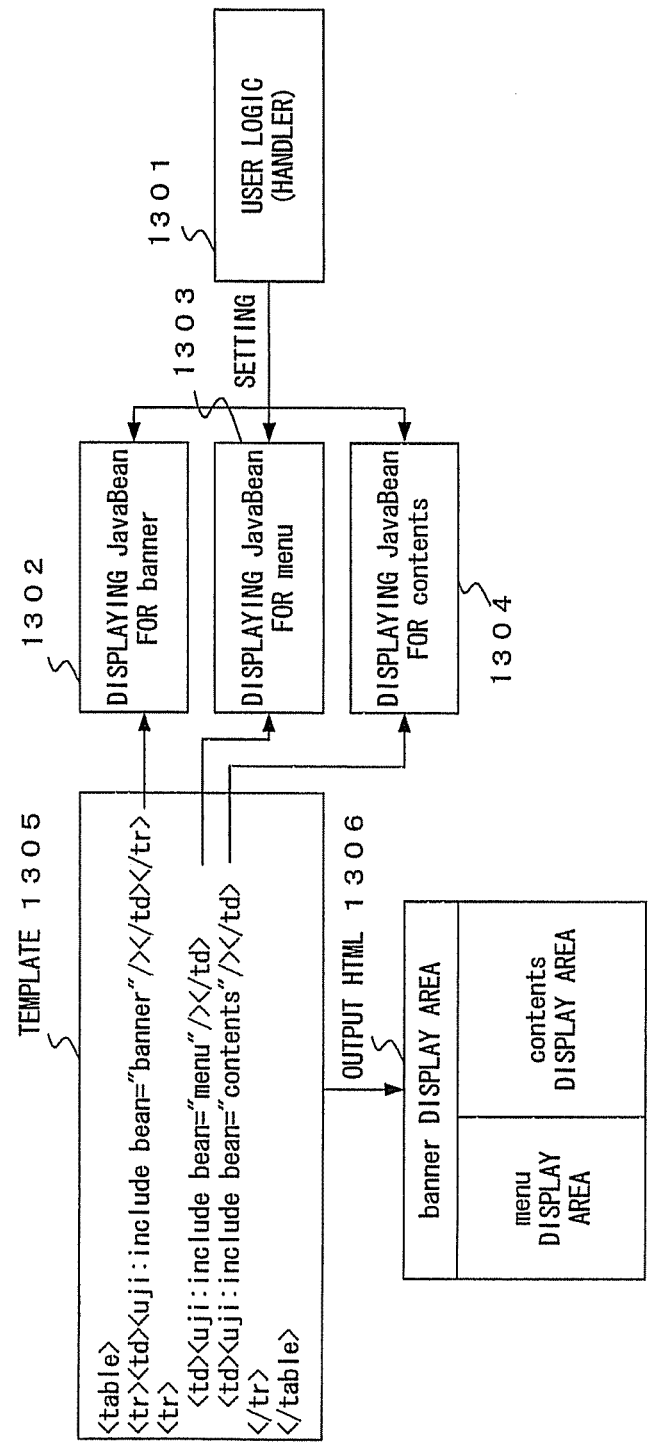
FIG. 16 shows a template for arrangement of a plurality of display parts on the display screen.

FIG. 16 shows the template (between 308 and 310 shown in FIG. 6) for arrangement of a plurality of display parts on a display screen. A user logic (handler) 1301 can set a plurality of displaying Java Beans. For example, as shown in FIG. 16, when a banner Java Bean 1302, a menu Java Bean 1303, and a contents Java Bean 1304 are set by the user logic (handler) 1301, the JSP corresponding to each Java Bean obtains data from each Java Bean, and generates each display screen. Since a display position is prescribed for each JSP in a template 1305, each of the generated display screen is arranged according to the template 1305, and an output HTML 1306 is output.

Figure 17:
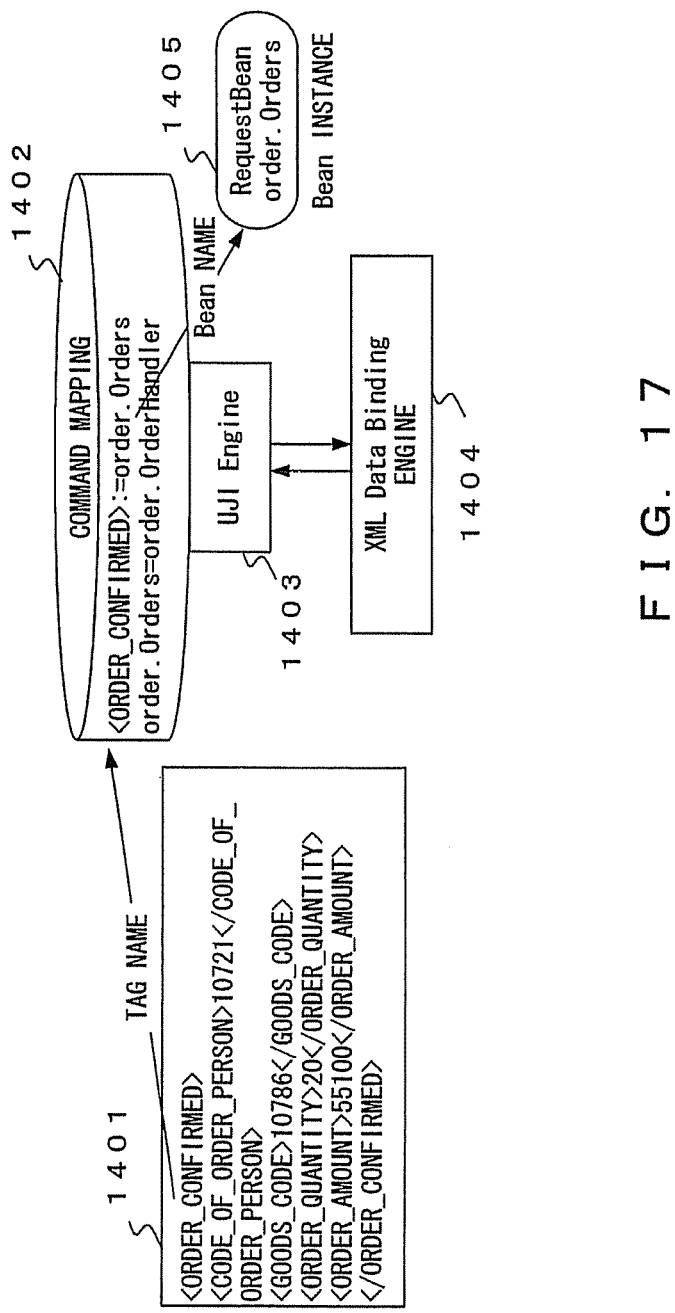
FIG. 17 shows the configuration (1) of the second embodiment of the present invention.
Figure 18:
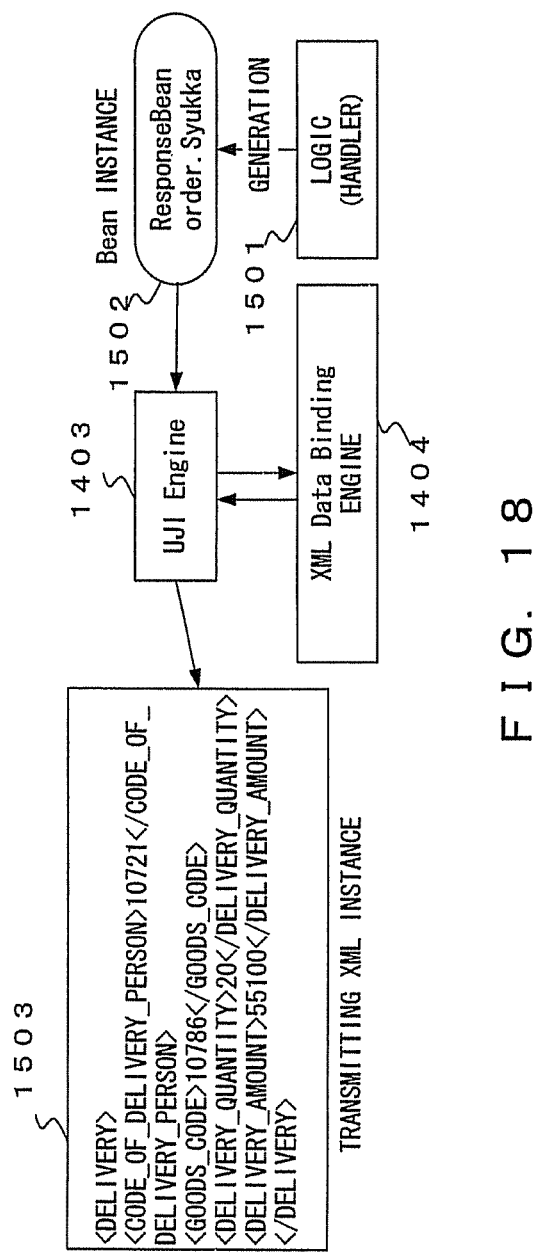
FIG. 18 shows the configuration (2) of the second embodiment of the present invention.

As described above, in the system according to the first embodiment of the present invention, an HTTP (HyperText Transfer Protocol) request is processed after being converted into a data object, and the data object obtained as a process result is converted into a response, and is returned to a client. Described below is the system according to the second embodiment of the present invention in which an XML (eXtensible Markup Language) file is processed by a similar system. FIGS. 17 and 18 show the configuration of the system.

FIG. 17 shows the process performed by a logic (handler) on an XML file when an application server receives the XML file. FIG. 18 shows the processes completely performed by the logic (handler) on the XML files and the response returned to the client.

First, in FIG. 17, when the server receives an XML instance 1401, the XML is processed by an XML data binding engine 1404 to generate a data object (Bean instance 1405). At this time, the type of object can be specified from the XML instance 1401. Therefore, XMLs of different types can be processed by the same engine. In this embodiment, the type of object can be specified using an XML mapping file (described later, but not shown in the attached drawings). In addition, an UJI engine 1403 determines a process (method) to be used by a logic (handler) according to the tag of the XML.

In FIG. 18, a logic (handler) 1501 generates a transmitting data object (Bean instance 1502) as in the case of the HTTP request. It is converted into an XML by the XML data binding engine 1404 to output a transmitting XML 1503.

The XML data binding engine 1404 for generating a data object is invoked by a "Factory class" in Java. Therefore, a plurality of binding engines can be flexibly operated by preparing a factory class for each type of binding engine.

Figure 19:
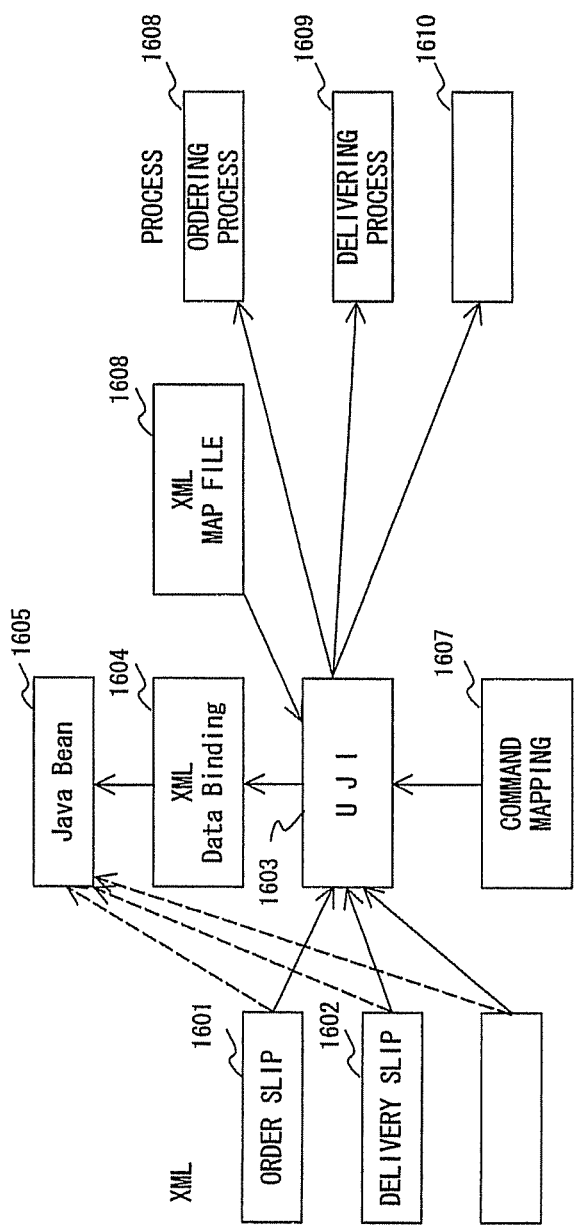
FIG. 19 shows the outline of the operation (from receiving an XML file to process it) of the system for processing an XML file.
Figure 20:
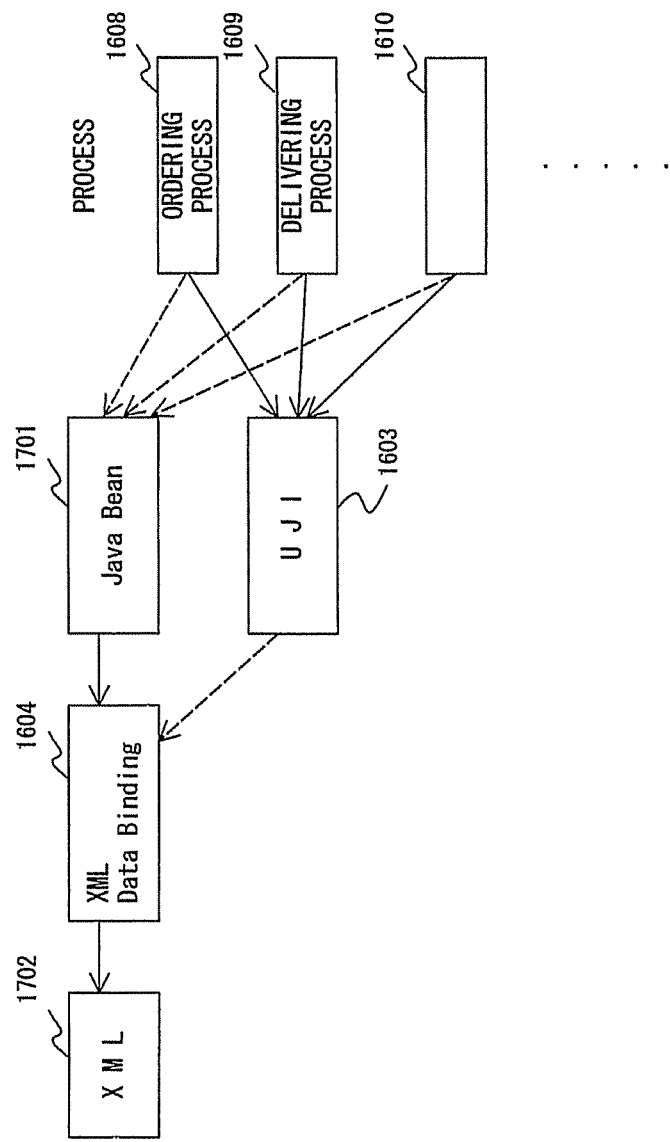
FIG. 20 shows the outline of the operation (up to returning a process result after receiving an XML file) of the system for processing an XML file.

FIGS. 19 and 20 show the outline of the operations of the system shown in FIGS. 17 and 18. FIG. 19 shows an application server receiving an XML file, and the process performed by a logic (handler) corresponding to FIG. 17. FIG. 20 shows the completion of the process by the logic and the return of a response to a client corresponding to FIG. 18.

In FIG. 19, when XML files such as an order slip 1601, a delivery slip 1602, etc. are transmitted to an application server (indicated by an arrow in solid lines), each piece of screen data is automatically converted into a Java Bean 1605 which is a data object (indicated by an arrow in dotted lines). In UJI 1603, the type of object of an XML instance is specified using an XML map file 1606. Then, a data object corresponding to the XML received by an XML data binding engine 1604 is generated. In addition, the UJI 1603 selects a process to be dispatched to from among processes 1608, 1609, 1610, etc. based on the tag of the XML and a command mapping 1607. The data object is passed to the selected process. When the data object is passed, the data object is processed based on the contents of the selected process.

When the process terminates, Java Bean 1701 which is a process result is passed to the UJI 1603. The Java Bean 1701 is converted by the XML data binding engine 1604 into a transmitting XML instance 1702.

Since a received XML is first converted by the XML data binding engine into a data object, and is then passed to a logic (handler) in the system according to the second embodiment of the present invention, a method of the same logic (handler) as the logic (handler) of the system according to the first embodiment of the present invention can be used when the process at the HTTP request is performed.

The system configuration and the system operation according to the first and second embodiments of the present invention are described above in detail. Described below are the operations of the system common between these embodiments.

Figure 21A:
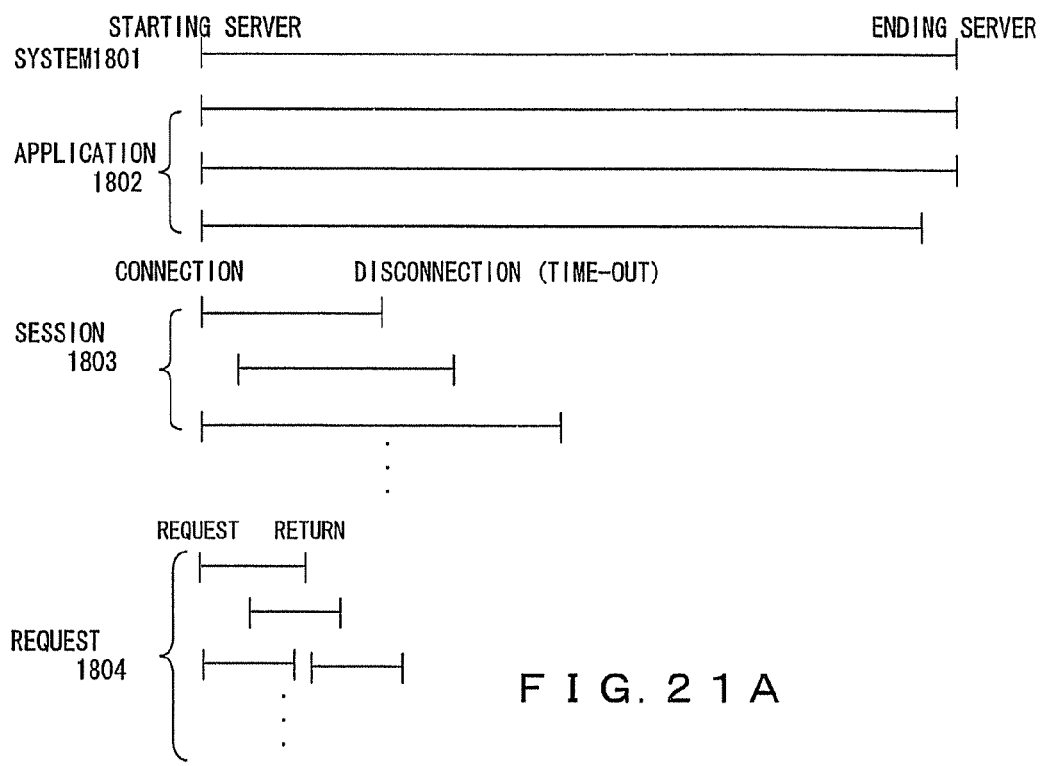
FIG. 21A shows the scope of objects forming the system according to the present invention.
Figure 21B:
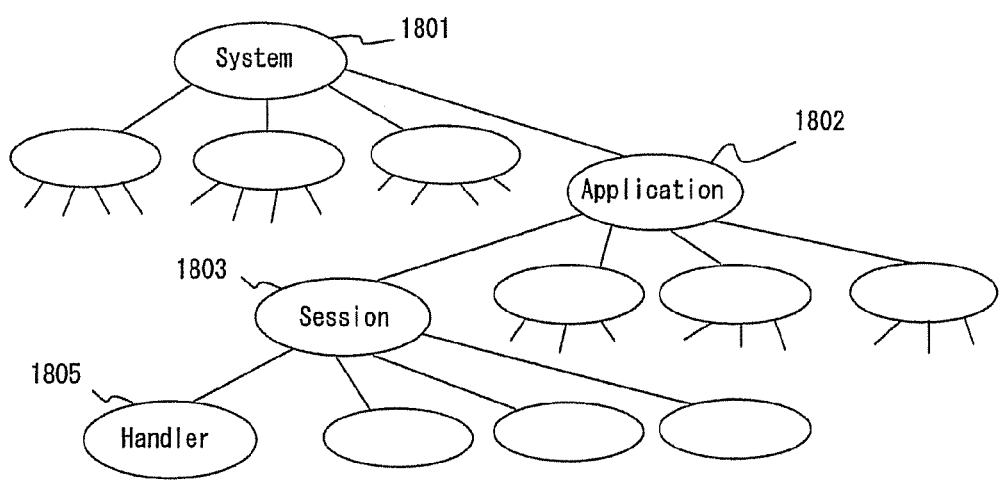
FIG. 21B shows the correspondence among the objects.

Objects forming the system according to the present invention can be classified into four stages of time scopes, that is, systems, applications, sessions, and requests, based on the relative positions on the time axis of each process. As shown in FIG. 21A, a system 1801 exists in a system and has a scope from the activation of an application server to the termination of the server. An application 1802 exists in each application in the system and has a scope from the start to the end of the application. A session 1803 exists in each client and has a scope from the connection to the disconnection (or a time-out) of a client. A request 1804 exists in each request from a client and has a scope from the process of a request from a client to the return of a response. FIG. 21B shows the correspondence among these objects. The system 1801 contains a plurality of applications 1802, and there is a session 1803 from a plurality of clients connected to the application 1802. A request from a client is processed in a handler 1805 provided in advance. The request 1804 shown in FIG. 21A corresponds to each thread when each object shown in FIG. 21B is executed.

Figure 22A:
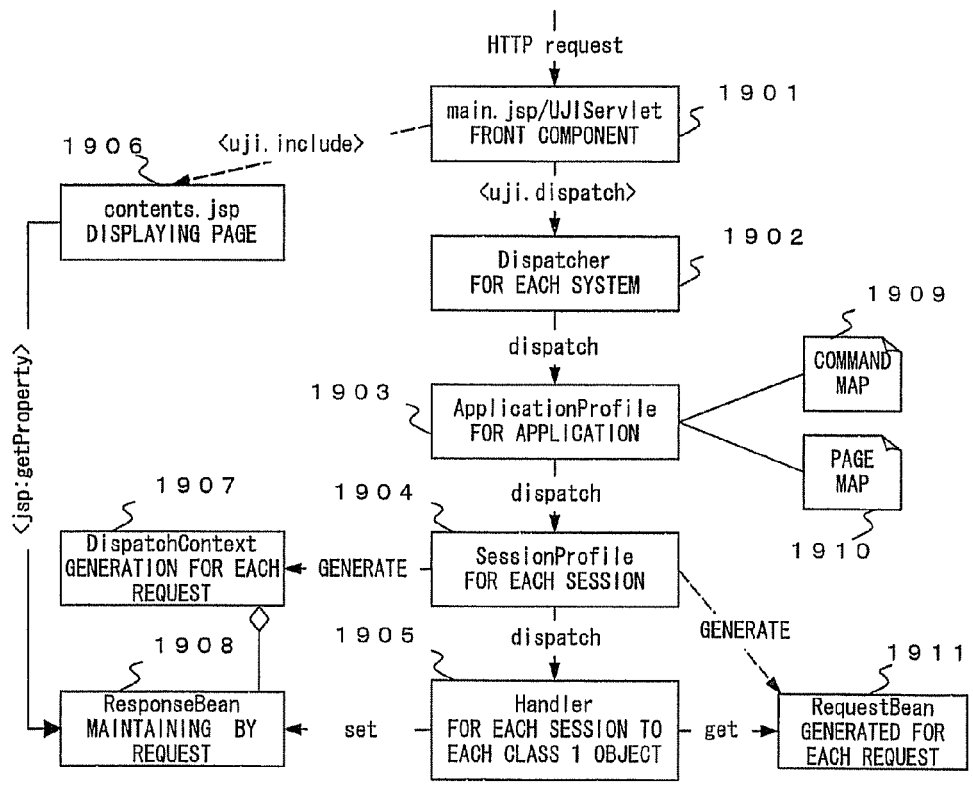
FIG. 22A shows the process of a request from a client.

Thus, by assigning stepwise time scopes to the objects forming a system, the process can be performed with an object having a larger scope dispatched into an object having a smaller scope when a request from a client is processed. That is, as shown in FIG. 22A, when a request is transmitted from a client to a front component 1901, a dispatcher 1902 existing in each system dispatches a process to a corresponding application 1903. Furthermore, the application 1903 dispatches the process to a session 1904 corresponding to the client which has transmitted the request, and the session 1904 dispatches the process to a handler 1905 corresponding to the request.

In the system according to the present invention, a request from a client is processed after being dispatched from a larger scope to a smaller scope. Therefore, the following effects can be obtained with each object of the application, the session, and the handler possibly extended or defined by a user. (In the system according to the present embodiment, the application 1903 and the session 1904 are installed as being possibly extended by a user for each object, and the front component 1901, a displaying page 1906, the handler 1905, a command map 1909, a page map 1910, ResponseBean 1908, and RequestBean 1911 are installed as being possibly defined by a user.)

Figure 22B:
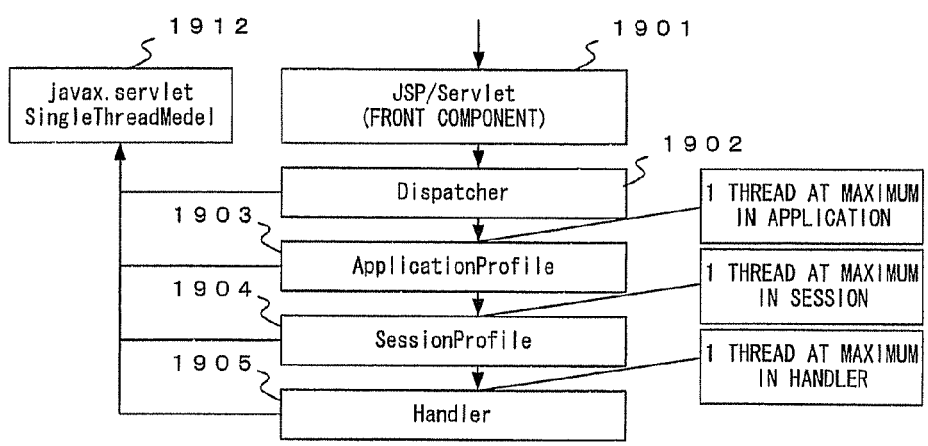
FIG. 22B shows the installation of SingleThreadModel.
Figures 23A, 23B:
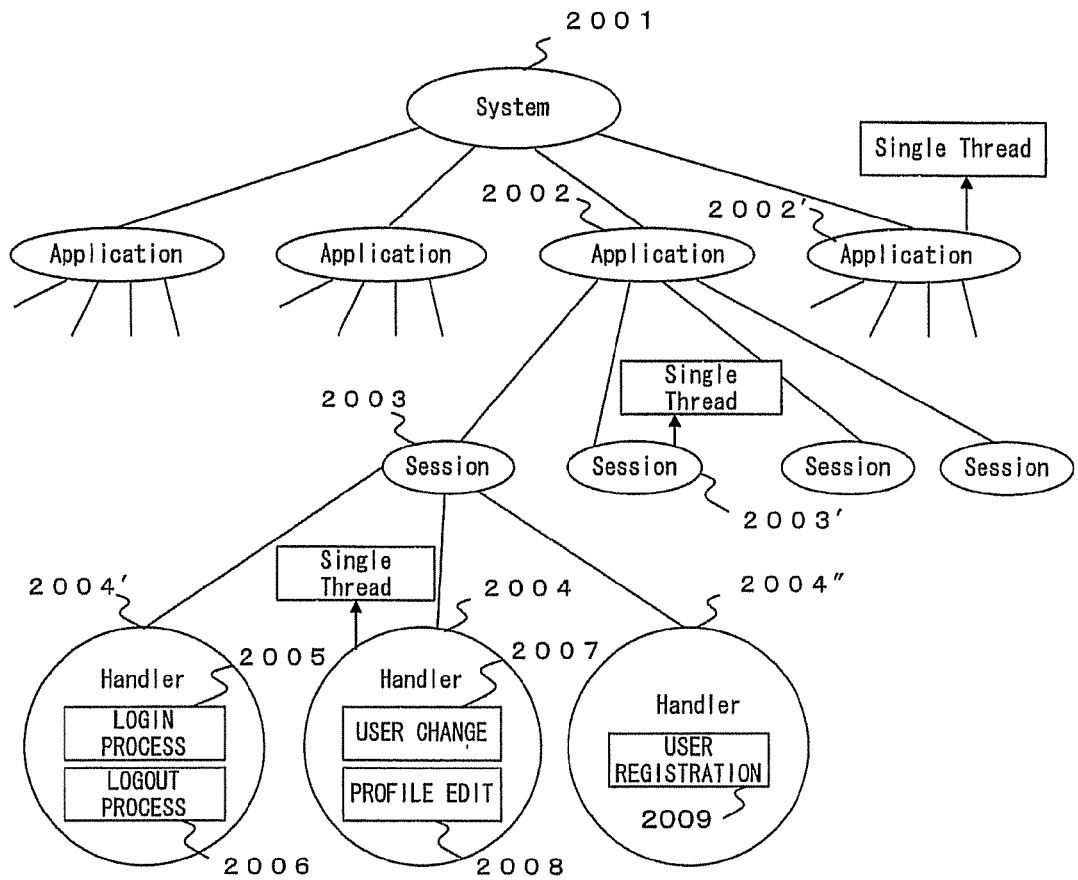
FIG. 23A shows practical installation of SingleThreadModel.
FIG. 23B shows an example of a description of a program description portion for installation of SingleTreadModel.

When an interface referred to as SingleThreadModel 1912 is installed for an object possibly extended or defined by a user (FIG. 22B), the operation of the object is limited to the maximum of 1 thread. Using the function, the operation of each scope can be thread-safe, that is, the data process such as simultaneous data editing processes, etc. can be prevented from being simultaneously performed. This process can be referred to as a 'single thread operation restriction'. In the above mentioned 'destination notice board' application (FIG. 7), a user change and a profile edit relate to the same data. Therefore, the operation is to be set thread-safe. In this case, each object can be installed as shown in FIG. 23A. That is, the SingleThreadModel interface is installed for a handler 2004 containing the method: user change 2007 and a method: profile edit 2008. In this case, a method: login process 2005, a method: logout process 2006, and a method: user registration do not have to be set thread-safe. Therefore, handlers 2004' and 2004" are not provided with the SingleThreadModel interface. Similarly, in a session and an application, the SingleThreadModel interface is to be installed when a thread-safe state is required (2002', 2003'). The description for installation of an interface is shown in FIG. 23B. FIG. 23B shows the session 2003' provided with the SingleThreadModel interface.

Furthermore, an application, a session, and a handler object, which are user-extended or user-defined objects, can be provided with a preprocessor or a postprocessor interface. As a result, a process can be added before or after the actual process of each object. That is, as shown in the sequence shown in FIG. 24, the preprocessor ((1) shown in FIG. 24) and the postprocessor ((3) shown in 24) of the actual process (handler method) ((2) shown in FIG. 24) of the request of the client can be added. Similarly, the preprocessor ((4) shown in FIG. 24) and the postprocessor ((6) shown in FIG. 24) can be added to the session ((5) shown in FIG. 24), and the preprocessor ((7) shown in FIG. 24) and the postprocessor ((9) shown in FIG. 24) can be added to the application ((8) shown in FIG. 24).

Using the function, in the preprocessor ((1) shown in FIG. 24), for example, it is possible to provide a check routine to skip the process of the handler method by determining in advance by state management before the actual process ((2) shown in FIG. 24) of the handler method of the logic. In addition, the postprocessor ((3) shown in FIG. 24) can be provided with an error handling for recovery from an error when an error occurs in the preprocessor ((1) shown in FIG. 24) or in the actual process ((2) shown in FIG. 24). They can also be used in describing a common postprocessor although no error has occurs. Similarly, for each session, a common preprocessor and postprocessor can be described for one client, and a common preprocessor and postprocessor can be described for a plurality of clients in an application. Each of the preprocessor and the postprocessor can be separately installed for an object of each scope, thereby possibly performing a controlling process in detail.

As described above, with the operation of the system according to the present invention, an effect of flexibly performing a pre-determining process and an error recovery process can be obtained by realizing a thread-safe operation or adding a preprocessor and a postprocessor to a process in each scope.

Described below is the system of issuing a request from a handler of a logic to a browser in an application server according to the present invention.

In a Web application, for example, a request for a process A can be transmitted from a client, the user (client) is inquired whether the process A is to be continued because any event has occurred, and it is determined based on the answer whether the process A is continued or another process is performed. Thus, when the user (client) is inquired during the process, and the process is performed based on the result of the inquiry, the sequence as shown in FIG. 25A is followed in a common Web application. When a request for the process A ((1) shown in FIG. 25A) is transmitted to a server, the server receives the request, and the handler 1 starts performing the process. Then, although the process A has not been completed, the user is inquired whether or not the process A is to be continued ((2) shown in FIG. 25A). For example, a screen 2701 is displayed for the client. The user returns 'yes' or 'no' as an answer ((3) shown in FIG. 25A). Based on the answer, the handler 2 starts performing the process.

Thus, in a common Web application, the process of the handler may be suspended although the process A has not been completed. In addition, when the answer from the user is 'yes', 'no', etc., it is necessary to define the mapping for an intermediate process for prescribing the correspondence between an inquiry and an answer ('yes' and 'no').

According to the system of the present invention, a system of issuing a request from a handler of a logic in an application server to a browser is adopted, thereby successfully improving the common Web application system.

Figures 26A, 26B, 26C:
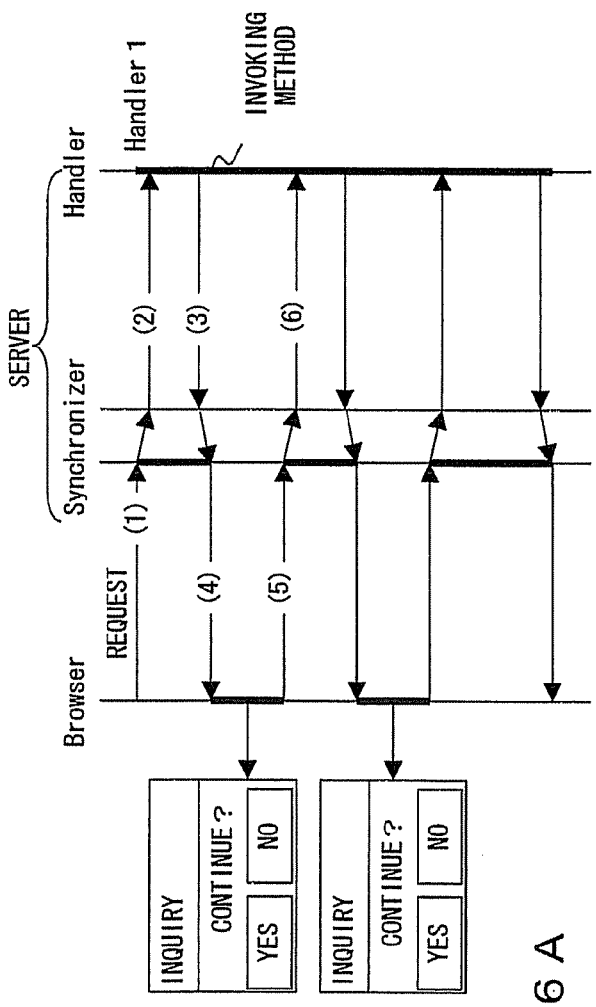
FIG. 26A shows the system of issuing a request from the handler of a logic to a browser in a common application server according to the present invention.
FIG. 26B shows a first example of describing a program for using the system of issuing a request from the handler of a logic to a browser in an application server according to the present invention.
FIG. 26C shows a second example of describing a program for using the system of issuing a request from the handler of a logic to a browser in an application server according to the present invention.

As shown in FIG. 26A, according to the system of the present invention, a thread buffer object (synchronizer) is provided before invoking a handler to monitor the operation of the handler. When the request ((1) shown in FIG. 26A) for the process A is transmitted to the server, the synchronizer in the server receives the request and passes it to the handler 1 ((2) shown in FIG. 26A), thereby activating the handler 1 and starting the process. If the user is inquired whether or not the process A is to be continued although the process A has not been completed, the handler 1 invokes the method for making a call back to the client ((3) shown in FIG. 26A). The synchronizer returns the method of the handler as a return value to the browser (client) ((4) shown in FIG. 26A). For example, a screen 2201 is displayed for the client. The user returns an answer with 'yes' or 'no' ((5) shown in FIG. 26A). The answer is received by the synchronizer, and passed to the handler 1 ((6) shown in FIG. 26A). Then, the handler 1 continues the process A. Thus, the process of the handler is not suspended by providing the thread buffer object. In describing a program for realizing a server, as shown in FIG. 25B in a common Web application, it is necessary to describe the handler 1 and the handler 2 for receiving an event for a return value from the handler 1. On the other hand, according to the present invention, they can be described in a conditional dispatch statement in one handler as shown in FIGS. 26B and 26C, thereby successfully simplifying the description of a program.

In the above mentioned embodiment of the present invention, the input from a client is HTTP, XML, etc. However, any request from a client is acceptable. In the above mentioned embodiments of the present invention, a request from a client is converted into a data object 'Java Bean', but other data objects are acceptable.

In the invention relating to the above mentioned embodiments, an input from a client is converted into a data object and is then processed, and a data object obtained as the conversion result is converted into a response to the client, and is then transmitted. In addition, the processes in the server are classified into time scopes to perform each process after dispatching it from a larger scope to a smaller scope.

Described below is a further embodiment of the present invention.

The embodiment explained below has been realized to improve the development efficiency and maintenance of a Web application by separately installing the definition (view) of a screen and the data embedded on the screen when an application server for performing the Web application is developed.

In this embodiment, the display unit in the Web application is prepared separately as a display data object and a definition (view) of a screen. At this time, the display data object includes display data, and is generated as an interface indicating a data structure (the data structure is referred to as a 'model' in the present embodiment) such as a table structure, a tree structure, etc., and a structure class including the display data. The definition of a view is described using the JSP (Java Server Pages) in this embodiment (the definition of a view can also be an HTML simply).

When the display data object and the definition of a view are performed in a server, an HTML sentence is generated by the execution engine corresponding to the above mentioned interface to assign the display data to a predetermined position on the screen. When the HTML sentence is transmitted to the client, the Web browser of the client displays a corresponding screen.

The embodiment to be described below is referred to as the 'third embodiment' to distinguish it from the above mentioned embodiments.

The configuration shown in FIG. 27 is described below. FIG. 27 shows the configuration of the system according to the third embodiment of the present invention.

A model object 3001 holds data which is obtained from a back end such as a database, etc. provided on the server side, and is displayed for a client. It also holds the data transmitted from a client to be passed to a back end, and is provided with a model interface 3002 described later. The model object 3001 can be separated into a displaying model object 3001a and an inputting model object 3001b, and can also be provided as a single displaying/inputting model object 3001.

The model interface 3002 is an interface indicating the structure of a specific model, and can be prepared depending on the target data structure, that is, an interface for a table model for a table structure, an interface for a tree model for a tree structure, etc.

A framework engine 3003 retrieves the data stored in the displaying model object 3001a through the model interface 3002 provided in the displaying model object 3001a, and generates an HTML sentence according to the definition of a displaying JSP 3004. It also analyzes the data input to a browser 3005, and passes it to the inputting model object 3001b.

The displaying JSP 3004 defines the view of the screen when display data is represented by the HTML, and is described by the JSP using a unique tag.

The browser 3005 is provided for a client to display a screen according to the HTML generated by the framework engine 3003 based on the definition of the displaying JSP 3004.

A front component 3006 accepts a request from the browser 3005, and passes it to the framework engine 3003. For example, it uses a JSP component or Servlet, but can be anything only if it can invoke the framework engine 3003 depending on the received contents.

The model interface 3002 shown in FIG. 27 is described further in detail by referring to the table model interface indicating a model of a table structure.

FIG. 28 shows an example of declaring a table model interface. In this example, the table model interface is defined by methods roughly classified into a data obtaining method, a data class obtaining method, and a data substituting method (for back end).

These methods are described furthermore in detail as a method for obtaining the number of columns on a table (getColumnCount), a method for obtaining the number of rows on a table (getRowCount) and a method for obtaining data of each cell on a table (getValueAt) for use in the definition shown in FIG. 28.

As a method for obtaining a data class, a method (getColumnClass and getRowClass) for obtaining a character string specifying the 'class' defined for each of the rows and columns is used in the definition shown in FIG. 28. The 'class' is used to define the format of the display method (for example, the display position, the size of a font, etc.) for the data about columns or rows, and indicates the attribute 'cls' of a renderer tag described later.

The method (setValueAt) for substitution of data is invoked by a model updating process (described later) corresponding to the table model to pass the contents (the values of the cells and the positions of the cells on the table) of the request from the client to the back end in the data format depending on the data structure indicated by the table model.

Figure 29:
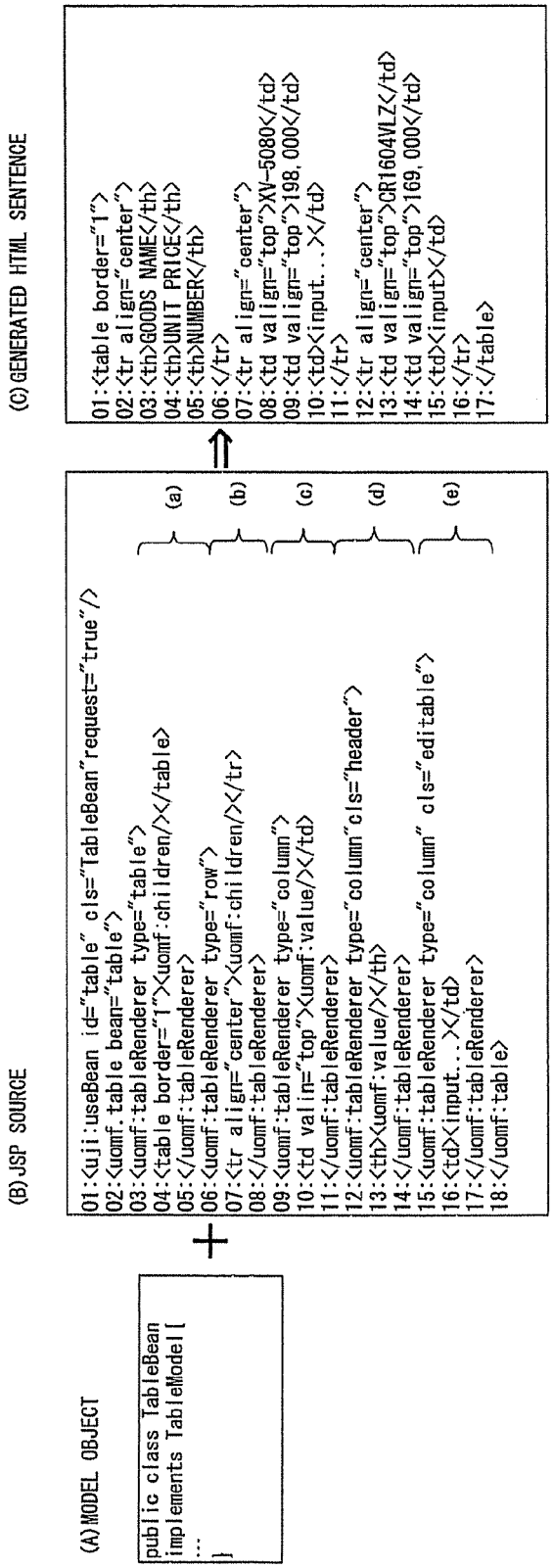
FIG. 29 shows the system of generating an HTML sentence according to a third embodiment of the present invention.

The generation of a HTML sentence according to the third embodiment of the present invention is described below by referring to FIG. 29. FIG. 29 shows that the framework engine 3003 generates an HTML sentence (C) based on the JSP source (B) corresponding to the displaying JSP 3004 if the framework engine 3003 for a table model shown in FIG. 27 is provided with the displaying model object 3001a (A) for realizing a table model interface for which the declaration shown in FIG. 28 is made. For easier explanation, each of the rows (B) and (C) starts with the row number.

Described below is the (B) JSP source shown in FIG. 29.

In (B) shown in FIG. 29, the first row specifies the correspondence between the JSP source and the model object (A).

The first row is described below furthermore in detail. That is, 'id= . . . ' specifies the name when a corresponding model object is referred to in the JSP source, and 'cls= . . . ' specifies the class name of a model object corresponding to the JSP source.

In the first row, 'request= . . . ' specifies the duration of the model object (A) in the framework engine 3003. This is based on the case in which the generated HTML sentence (C) is transmitted to a client to allow the browser 3005 to display a screen, and then the request corresponding to the model object is returned from the client. That is, when true is specified, the model object (A) is stored in the storage area in the framework engine 3003 even after the HTML sentence has been generated so that the contents of the above mentioned request can be immediately substituted for the model object. On the other hand, is false is specified, the model object (A) is not stored in the storage area in the framework engine 3003 after the HTML sentence has been generated.

In and after the second row of (B) shown in FIG. 29, the view of the screen for display of a table model is defined using a tag.

The view is described using a view tag. A start tag of a view tag for a table model is shown in the second row (<uomf: table>), and renderers for some tables are described between the second row and the end tag (</uomf:table>) of the view tag for a table model in the eighteenth row.

The renderer defines the display method used in displaying data at a specified display position. In the description in the third through seventeenth rows of (B), five definitions (a) through (e) of renderers are made for table models. These definitions of the table renderers are briefly described as follows. (a) is used to generate a table tag (<table> and </table>). (b) is used to define the display system of a row on a table. (c) is used to define the display system of a normal column on a table. (d) is used to define the display system of a cell (header cell) in which the header of each column is contained on a table. (e) is used to define the display system of a cell in which data can be input (data can be updated) on a table.

Each renderer has a start tag (<uomf:tableRenderer>) of a renderer tag for a table model in the first row, and the corresponding end tag (</uomf:tableRenderer>) is described in the last row. The description in the rows between the start tag and the end tag of the renderer tag defines the display method of data. Each element forming part of the definition about the data display method is referred to as a renderer element.

A renderer tag specifies 'type' and 'cls'. They specify the position on the screen for display in a display method defined by a renderer. The specified contents are designated in advance by the type of model.

'Type' specifies one of a table (entire table), a row, and a column which specify the position of the table on which data is displayed in the display method defined by the renderer.

'Cls' can be specified (or it may not be specified) when the above mentioned 'type' is specified for the row or the column in a table model according to the present embodiment. It relates to both methods getRowClass and getColumnClass in the example of the declaration (shown in FIG. 28) of the above mentioned table model interface. For example, when a column is to be displayed, the getColumnClass method of a table model interface is invoked. Then, the definition of the renderer of a view is referred to, and the definition of the display method in the renderer whose 'type' is column, and which corresponds to the return value of the method in which the 'cls' is invoked is used to generate an HTML sentence as a display method for display of a column. If there is no return value (null) of the invoked method, the definition of the display method about a renderer for which no 'cls' is specified is used for generation.

For the 'cls', a header or an editable is practically specified in a table model according to the present embodiment.

The definition of the display method in a renderer is described using a tag of a well-known HTML into which a special tag 'renderer element tag' is introduced. In (B) shown in FIG. 29, <uomf:children> and <uomf:value> are renderer element tags. The <uomf:children> allows the framework engine to perform the operation of developing the definition of the display method in another renderer at the position of the tag. The <uomf:value> allows the framework engine to perform the operation of displaying a value (display data) obtained from the model interface at the position of the tag.

The more detailed operations of these tags are prescribed in advance by the type of model. In the table model according to the present embodiment, <uomf:children> prescribes that the display system defined by the renderer (renderer specifying a row for 'type') about a row is developed and inserted at the position if the tag appears when the specification of 'type' in the renderer tag is table (entire table). It prescribes that the display system defined by the renderer (renderer specifying a column for 'type') about a column is developed and inserted at the position if the tag appears when the specification of 'type' in the renderer tag is table (entire table). The <uomf: value> is available only in the renderer specifying a column for 'type'. It is prescribed that the value obtained in the getValueAt method used in an example of the declaration of a table model interface (shown in FIG. 28) is inserted in the position.

The operation of generating a HTML sentence of (C) by a framework engine is described below by referring to FIG. 29.

First, the framework engine recognizes that the model object of (A) is provided with a table model interface, and activates the framework engine for a table model. Then, both getColumnCount and getRowCount methods of the table model interface are invoked, and the number of columns and the number of rows of the table to be displayed are recognized. As a result, it is recognized that the table of 3 rows×3 columns is displayed.

Then, in the JSP source of (B), the definition of the table renderer of (a) specifying a table for 'type' is first referenced, and the first row of the HTML sentence of (C) is generated.

Since a renderer element tag <uomf:children> is described in the definition (fourth row of (B)) of the table renderer of (a), and the renderer tag (in the third row of (B)) of (a) specifies a table for 'type', the definition of the table renderer for a row, that is, the table renderer of (b) in the JSP source of (B), is developed, and the second row of the HTML sentence of (C) is generated.

Since a renderer element tag <uomf:children> is described in the definition (in the seventh row of (B)) of the table renderer of (b), and a row is specified for 'type' in the renderer tag (in the sixth row of (B)) of (b), the definition of a table renderer for a column is developed. However, since the JSP source of (B) describes three table renderers (renderer specifying a column for 'type') for the columns (c), (d), and (e)), it is necessary to determine which table renderer is to be developed for definition.

At this time, the framework engine obtains the value of a cell in each column in the first row of the table to be displayed, and invokes the getColumnClass method of the table model interface from the model object of (A). In these processes, the obtained value of the cell refers to character string data containing tree pieces of data, that is, a 'goods name', a 'unit price', and a 'number', and the return value for the invoked method is a header for each of the three values.

The framework engine selects the definition of the table renderer of (d) in the JSP source of (B) based on the return value for the method, and develops the definition. As a result, the HTML sentence (in the third, fourth, and fifth rows of the HTML sentence of (C)) indicating the display system in the first row of the table to be displayed is generated based on the contents of the definition (in the thirteenth row of (B)) of the table renderer of (d). Since the definition of the table renderer of (d) contains a renderer element tag <uomf:value>, the value of each cell obtained from the model object is inserted into this portion.

Up to this point in the process, the above mentioned development of the renderer element tag <uomf:children> in the definition (in the seventh row of (B)) of the table renderer of (b) is completed, and the sixth row of the HTML sentence of (C) is generated based on the description (</tr>) of the definition subsequent to the tag, and the HTML sentence for display in the first row of the table is completely generated.

Next, the generation of the HTML sentence for display in the second row of the table is started, the definition of the table renderer about a row, that is, the table renderer of (b) in the JSP source of (B), is developed again, and the seventh row of the HTML sentence of (C) is generated.

As in the above mentioned process, the definition of the table renderer of (b) is developed into the definition of the table renderer about a column of the renderer element tag <uomf:children>.

At this time, the framework engine obtains the value of a cell in each column in the second row of the table to be displayed, and invokes the getColumnClass method of the table model interface from the model object of (A). In these processes, the obtained value of the cell refers to character string data containing tree pieces of data, that is, 'XV-5080', '198,000', and '' (null), and the values for the first two cells are null data, and the value for the last cell is editable.

The framework engine develops the definition of the table renderer of (c) in the JSP source of (B) based on the return value of the method for the first two cells. As a result, the HTML sentence (in the eighth and ninth rows of the HTML sentence of (C)) indicating the display system at the first column in the second row and the second column in the second row of the table to be displayed is generated based on the contents of the definition (in the tenth row of (B)) of the table renderer of (c). Since the definition of the table renderer of (c) contains a renderer element tag <uomf:value>, the value of each cell obtained from the model object is inserted into this portion.

Furthermore, the framework engine develops the definition of the table renderer of (e) in the JSP source of (B) based on the return value of the method for the last cell. As a result, the HTML sentence (in the tenth row of the HTML sentence of (C)) indicating the display system at the third column in the second row of the table to be displayed is generated based on the contents of the definition (in the sixteenth row of (B)) of the table renderer of (e).

Up to this point in the process, the above mentioned development of the renderer element tag <uomf:children> in the definition (in the seventh row of (B)) of the table renderer of (b) is completed, and the eleventh row of the HTML sentence of (C) is generated based on the description (</tr>) of the definition subsequent to the tag, and the HTML sentence for display in the second row of the table is completely generated.

The flow of generating the twelfth row through the sixteenth row of the HTML sentence of (C) (the HTML sentence for display of the third row of the table) is the same as the HTML sentence (from the seventh row to the eleventh row of the generated HTML sentence of (C)) for display of the second row of the above mentioned table.

Up to this point in the process, the above mentioned development of the renderer element tag <uomf:children> in the definition (in the fourth row of (B)) of the table renderer of (a) is completed, and the seventeenth row of the HTML sentence of (C) is generated based on the description (</table>) of the definition subsequent to the tag, and the HTML sentence for display Of the table of (C) is completely generated.

As described above, the generated HTML sentence is transmitted to the client. Then, to easily specify which model object a request corresponding to the HTML sentence relates to when the request is transmitted from a client, an input tag (<input type=hidden>) of a hidden attribute, for which an input field may not be displayed depending on the browser executed by the client, is transmitted after being added to the generated HTML sentence. The input tag describes a character string indicating the type of model and a unique ID (identifier) for each view used in generating an HTML sentence. These character string and ID are automatically contained in the request.

Figure 30:
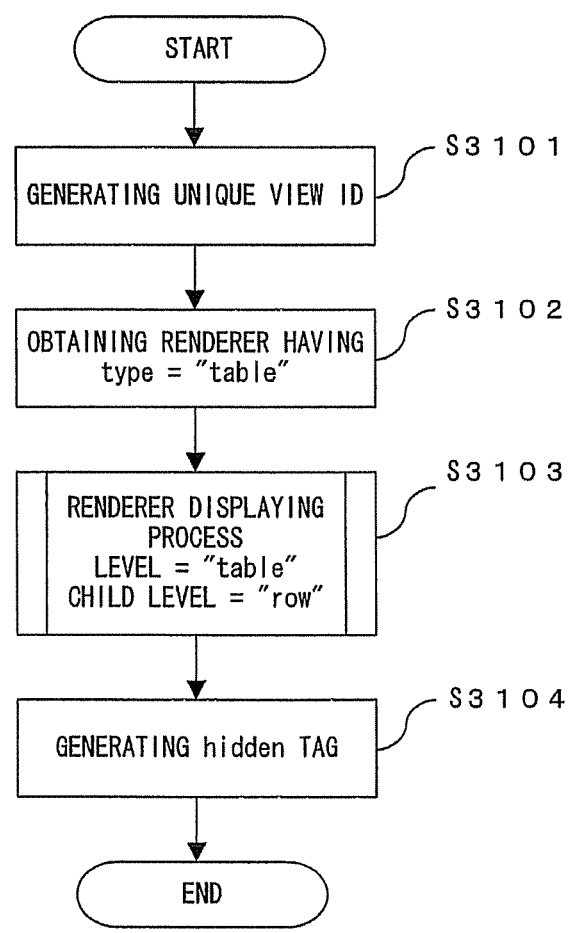
FIG. 30 is a flowchart (1) of the controlling process when data is displayed.
Figure 31:
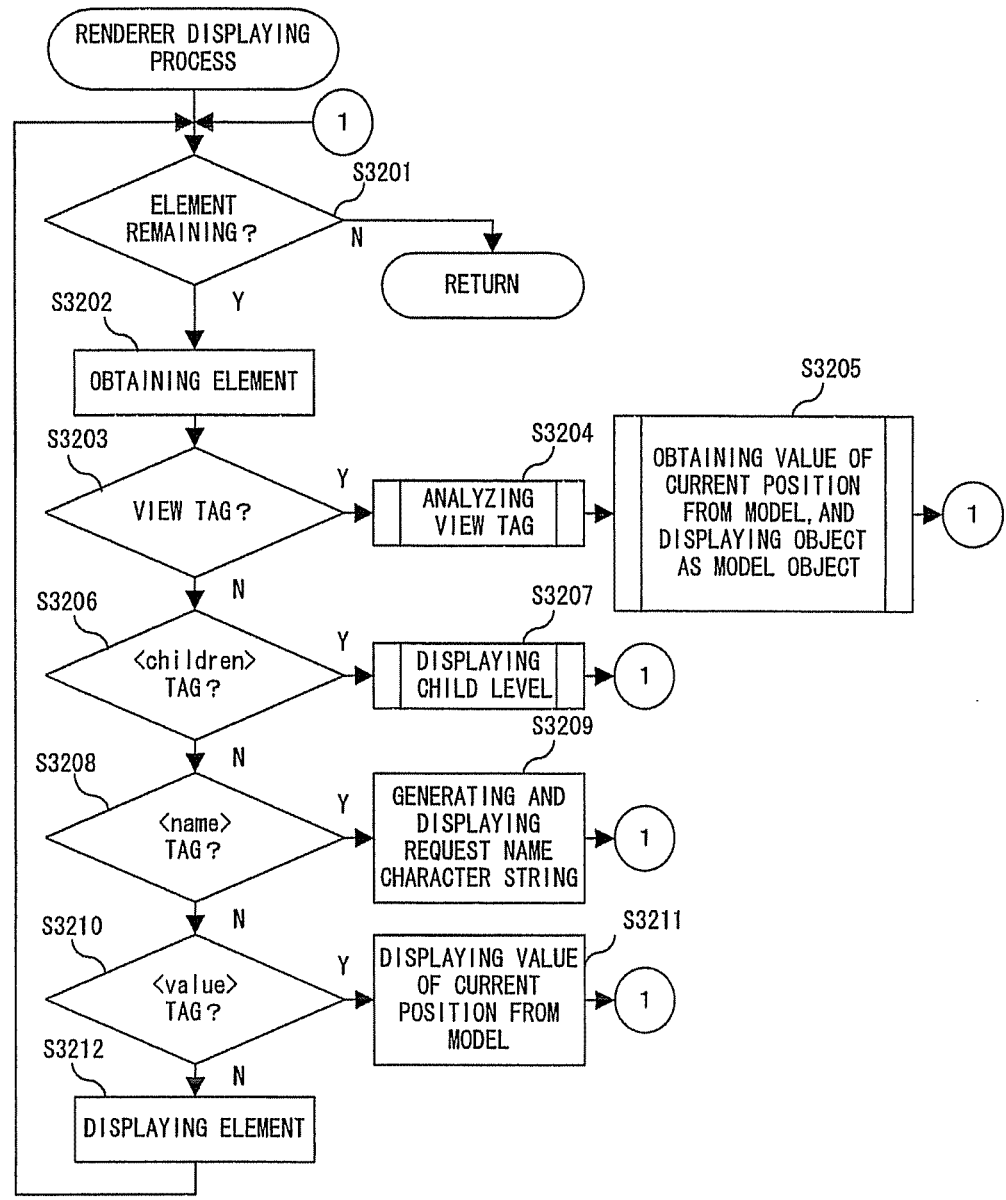
FIG. 31 is a flowchart (2) of the controlling process when data is displayed.

The flowcharts shown in FIGS. 30, 31, and 32 show the above mentioned process of the framework engine 3003 for a table model shown in FIG. 27 generating a HTML sentence for display of a table for a client through the browser 3005. The process is referred to as a 'process for display'.

The framework engine 3003 first reads the displaying JSP 3004, and detects a view tag contained in the displaying JSP 3004. Then, each renderer contained in the view indicated by the view tag is classified based on the 'type' and 'cls' specified by the renderer tag, and is then registered at a predetermined position in the memory buffer. Furthermore, when the registration is completed, the framework engine 3003 starts the process according to the flowcharts shown in FIGS. 30, 31, and 32 while obtaining data from the model object 3001 specified by the view tag. The process up to this step is referred to as a 'view tag analyzing process'.

FIG. 30 shows the entire flow of the control process for display performed by the framework engine 3003 for a table model.

When the process shown in FIG. 30 is started, the unique ID of a view is generated (S3101). The unique ID of a view is an ID unique for each view of the displaying JSP 3004 used in generating an HTML sentence. For example, a combination of a common prefix (a part of 'uji.model.') such as 'uji.model.00001' and a serial number (a part of '00001') different for each process of generating an HTML sentence. The unique ID different for each view is used by a server to identify which model object a received request relates to when a plurality of model objects are displayed on the client side and the server receives a request for each of them. The client generates a request containing an ID corresponding a model object.

Then, a renderer specifying a table for 'type' is obtained in the renderers registered in the buffer of the framework engine 3003 in the above mentioned process (S3102).

Next, a renderer displaying process with a table set for a level and a row set for a child level (S3103). The renderer displaying process is shown in the flowchart in FIG. 31, and the details are described later.

An HTML sentence for display of a table is generated in the process in S3103. The framework engine 3003 generates an input tag of the above mentioned hidden attribute, and adds it to the HTML sentence (S3104). The generated input tag is, for example, described below.

<input type=hidden name="uji.model" value="uji.model.00001">
<input type=hidden name="uji.model.00001" value="table">

The 'uji.model.00001' is an example of a unique ID of a view generated as described above. The information is contained in the request corresponding to the HTML sentence by adding these input tags to the HTML sentence, and the correspondence between the request and the model object 3001 becomes clear.

Described below is the renderer displaying process performed in S3103 shown in FIG. 30, and shown by the flowchart shown in FIG. 31.

In the subsequent description and drawings, the expression (for example, <children>) with the prefix 'uomf:' omitted can be used in addition to the expression (for example, <uomf: children>) of a renderer element tag used as described above.

First, it is checked what is the level when the renderer displaying process is invoked, and it is determined whether or not there still is an element used in defining the display system in the renderer specifying the level for 'type' (S3201). If the determination result is yes, the next element (renderer element) is obtained (S3202), and control is passed to the process in S3203. If the determination result is no, the renderer displaying process terminates, and control is returned to the start of the process.

Then, it is determined what is the element obtained in the process in S3202 (S3203, S3206, S3208, and S3210).

As a result, if the obtained element is a view tag (yes as a determination result in S3203), then the above mentioned view tag analyzing process is performed on the view tag (S3204), and then the above mentioned process shown in FIG. 30 is performed on the view tag (S3205). After the completion of the process, control is returned to the process in S3201.

The processes in S3204 and S3205 are performed when a view is described while another view is being described (the views are nested). For example, the processes are performed when a model exists in a cell containing a table model.

If the element obtained in the process in S3202 is a renderer element tag of <children> (yes as a determination result in S3206), then it is checked what is a child level when the renderer displaying process is invoked, and the displaying process is performed on the child level (S3207). After the completion of the process, control is returned to the process in S3201. The displaying process when the child level is row is indicated by the flowchart shown in FIG. 32A, and the displaying process when the child level is column is indicated by the flowchart shown in FIG. 32B. These displaying processes are described later.

If the element obtained in the process in S3202 is a renderer element tag of <name> (yes as a determination result in S3208), then a process of naming an element used in a subsequent request is performed (S3209). After this process, control is returned to the process in S3201.

Described below is a renderer element tag of <name>. The tag is used to allow a framework engine to generate a name according to a predetermined rule.

According to the present embodiment, the name is generated according to the rule shown in FIG. 33A. A model-unique position is represented by a character string uniquely indicating the position in a model. For example, if it indicates the third column in the second row in a table model, a character string of, for example, '2__3' can be generated. At this time, if an example of generating a unique ID of the above mentioned view ("uji.model.00001") is used as is, the name generated corresponding to the renderer element tag of <name> is shown in FIG. 33B.

By assigning a name according to the above mentioned rule, a model object and the position in the model can be specified by the name.

FIG. 34 shows an example of a definition of a renderer using the renderer element tag of <name>. Described below is the definition shown in FIG. 34. A value obtained from a model object by <uomf:value/> is inserted into a cell which can be updated in a table, and is displayed for a client. When the value of a cell is updated on the client side, a request is transmitted. At this request, the name generated by <uomf: name/> is used as a reference name for reference of the value of a cell after an updating process. Thus, since the table model engine can specify a model object and the position in the model from the reference name according to the above mentioned naming rule, one request generated by a client can contain plural pieces of update data, and furthermore, one request can contain plural pieces of update data about different model objects.

When a renderer element tag of <uomf:name> is described in the above mentioned nested views, a combination of the name (for example, the name shown in FIG. 33B) generated outside the nest as a prefix and a serial number, etc. to generate the above mentioned view-unique ID as in the example shown in FIG. 33C, and a combination of the view-unique ID and the model-unique position in the nested view can be generated as the name of the renderer element tag. According to this naming rule, the existence of a nest and the view inheriting status can be recognized, and the model relating to the nest can be specified.

Described below is the process shown in FIG. 31.

If the element obtained in the determining process in S3202 is a renderer element tag of <value> (yes as a determination result in S3210), the value corresponding to the current position in the table model is obtained from the model object (S3211), and then control is returned to the process in S3201.

On the other hand, if the element obtained in the determining process in S3202 is different from any of the block diagram tags (no as the determination results in S3203, S3206, S3208, and S3210), then the obtained element is displayed in the generated HTML sentence as is (S3212), and then control is returned to the process in S3201.

Described above is a renderer displaying process.

Described below is the displaying process on a child level performed in S3207 of the above mentioned renderer displaying process. As described above, the displaying process when the child level is row is indicated by the flowchart shown in FIG. 32A, and the displaying process when the child level is column is indicated by the flowchart shown in FIG. 32B.

Figures 32A, 32B:
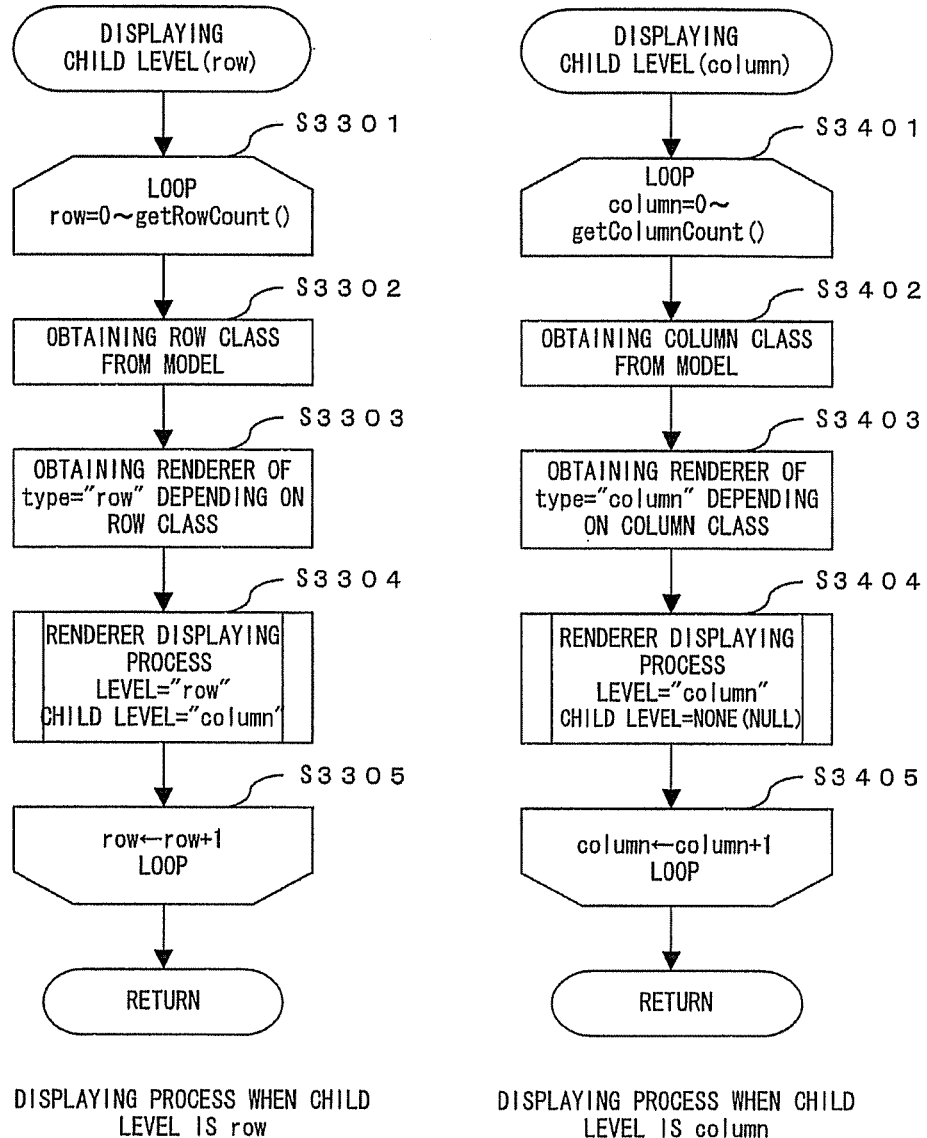
FIGS. 32A and 32B are flowcharts (3) of the controlling process when data is displayed.

Described below is the flowchart shown in FIG. 32A.

First, the value of the variable row is set to 0, and the processes in S3302 through S3304 are repeated until the value of the variable row exceeds the return value (that is, the number of rows in a table) of the getRowCount( )method (S3301).

Then, from the model object 3001, a row class (getRowClass( ) for the row expressed by the value of the variable row is obtained (S3302).

Next, from each renderer registered in a buffer of the framework engine 3003, a renderer for which an obtained row class is specified for 'cls', and a row is specified for 'type' is obtained (S3303).

A renderer displaying process when a row is specified for level, and a column is specified as a child level is performed (S3304). The renderer process to be performed is described as shown in FIG. 31.

Then, the value obtained by adding 1 to the value of the variable row is substituted for the variable row, and control is returned to S3301 (S3305). If the value of the variable row has reached the above mentioned condition, the process terminates, and control is returned to the start of the process.

Described below is the flowchart shown in FIG. 32B. This process is basically the same as the above mentioned process shown in FIG. 32A.

First, the value of the variable column is set to 0, and the processes in S3402 through S3404 are repeated until the value of the variable column exceeds the return value (that is, the number of columns in a table) of the getColumnCount( ) method (S3401).

Then, from the model object 3001, a row class (getColumnClass( ) for the row expressed by the value of the variable row is obtained (S3402).

Next, from each renderer registered in a buffer of the framework engine 3003, a renderer for which an obtained column class is specified for 'cls', and a column is specified for 'type' is obtained (S3403).

A renderer displaying process when a column is specified for level, and none (null) is specified as a child level is performed (S3404). The renderer process to be performed is described as shown in FIG. 31.

Then, the value obtained by adding 1 to the value of the variable column is substituted for the variable column, and control is returned to S3401 (S3405). If the value of the variable column has reached the above mentioned condition, the process terminates, and control is returned to the start of the process.

Described above is a displaying process.

Figure 35:
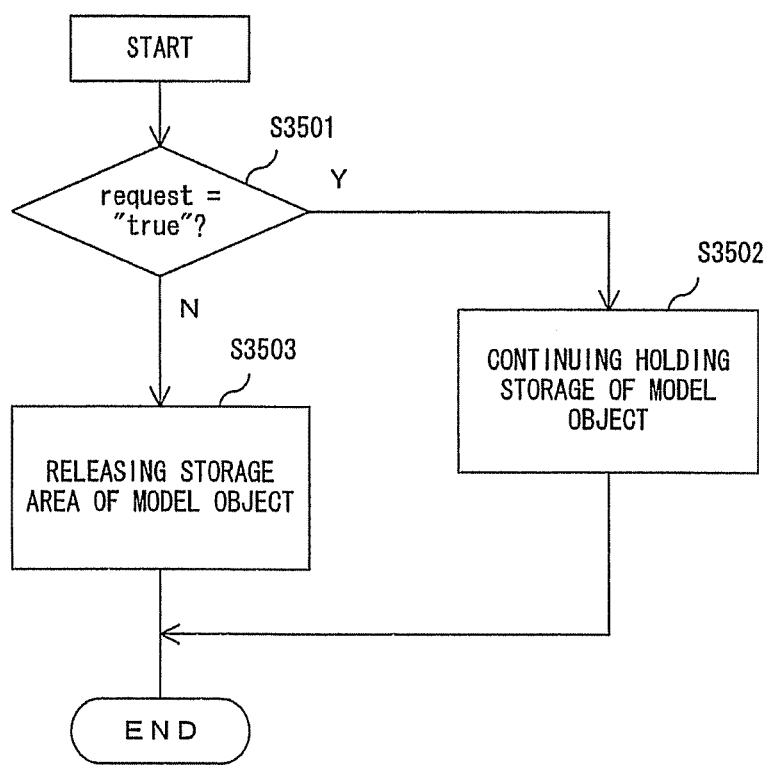
FIG. 35 is a flowchart of a storage area managing process.

After the displaying process is completed, the framework engine 3003 refers to the description (the first row in the example shown in FIG. 29B) indicating the correspondence between the JSP source of the displaying JSP 3004 and the model object 3001, and performs a storage area managing process shown in FIG. 35. That is, it is determined whether or not true is set for a request (S3501). If the determination result is yes, then the contents of the model object 3001 stored in the storage unit of the framework engine 3003 is still continued (S3502). If the determination result is no, then the storage area of the model object 3001 in the storage unit of the framework engine 3003 is released (S3503).

Described below is the operation of updating the model object 3001 after the framework engine 3003 receives a request issued from the browser 3005 in the system shown in FIG. 27. The operation is referred to as an operation performed when a request is issued.

Figure 36:
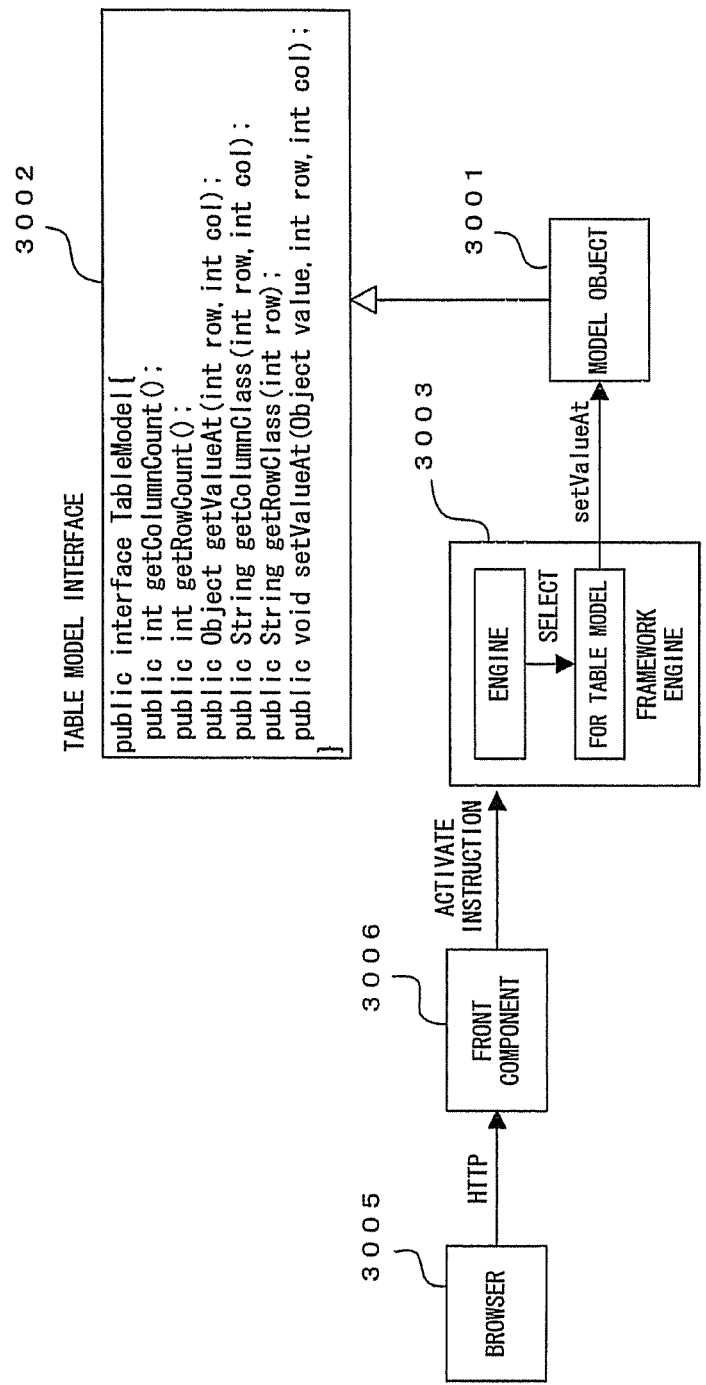
FIG. 36 shows the outline of the operation when a request is issued in the system shown in FIG. 27.

FIG. 36 shows the outline of the operation performed when a request in the system shown in FIG. 27.

First, a client receives an HTML sentence which is generated by the framework engine 3003 and contains a normal (not a hidden attribute) <input> tag, and the browser 3005 provided for the client displays a table based on the HTML sentence. When the data corresponding to the <input> tag is input to the client, the browser 3005 transmits the request by the HTTP containing the data to the server side.

Upon receipt of the HTTP request, the front component 3006 issues an activate instruction to the framework engine 3003, and passes the request to the framework engine 3003.

The framework engine 3003 first determines to which model the received request relates. The determination is made using the information about the type of model contained in the request by the effect of the <input> tag of the above mentioned hidden attribute. If it is determined that the request relates to a table model, an engine for a table model is selected and activated.

Then, the framework engine 3003 specifies the model object 3001 to for which the data contained in the request is substituted based on the unique ID of a view contained in the request by the effect of the <input> tag of the hidden attribute.

If the specified model object 3001 is stored in the storage area in the framework engine 3003, then the data contained in the request is substituted for the stored object. If it is not stored, the model object 3001 is newly generated and the data is substituted for the object.

To substitute the data for the model object 3001, the substitute data is converted into an update method depending on the model, and an interface method (for example, a setValueAt method to update the model interface 3002 shown in FIG. 28) is invoked, thereby updating the model object 3001.

Figures 37A, 37B:
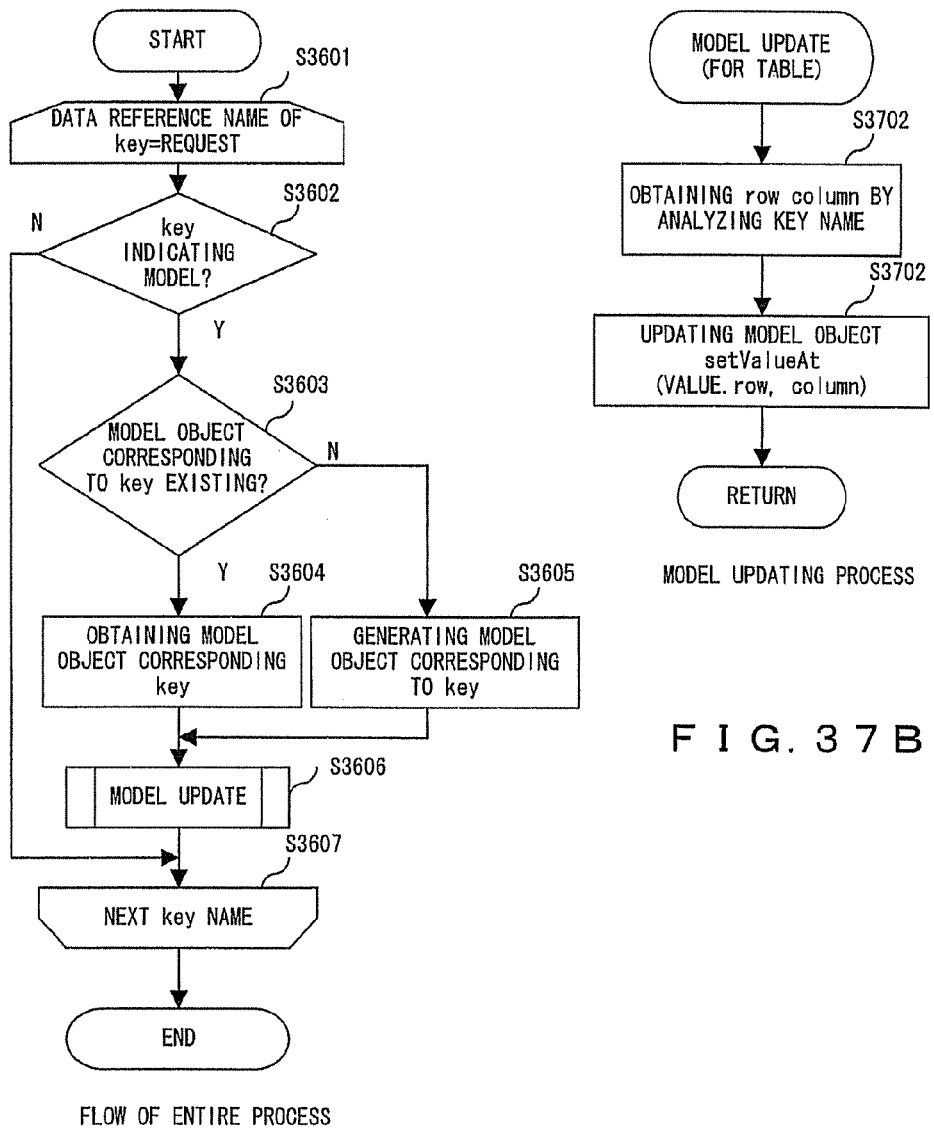
FIGS. 37A and 37B are flowcharts of the controlling process when a request is issued.

FIGS. 37A and 37B are flowcharts of the contents of the above mentioned control process performed when a request is issued.

FIG. 37A shows the entire flow of the control process, and FIG. 37B shows the model updating process for a table model to be performed during the control process.

As described above, the request containing the data input corresponding to the display based on the HTML sentence generated by the browser 3005 of a client in the above mentioned displaying process indicates the reference name of the data according to the above mentioned naming rule. Upon receipt of a request, the framework engine 3003 retrieves all reference names contained in the request. Then, one of the retrieved reference names is substituted for the variable key (S3601).

Then, it is determined whether or not the value of the variable key indicates the model to be processed by the framework engine 3003 (S3602). If the determination result is yes, it is determined whether or not the model object 3001 corresponding to the variable key is stored in the storage unit of the framework engine 3003 (S3603).

If the determination result of the S3603 is yes, the model object 3001 stored in the storage unit is obtained (S3604). If the determination result of the S3603 is no, the model object 3001 is newly generated (S3605). Then, the model updating process is performed on the model object 3001 (S3606).

After completing the model updating process, or if the determination result of S3602 is no, another reference name retrieved from the request is set in the variable key, and the process is repeated until the above mentioned processes from S3602 through S3606 have completely been performed on all reference names (S3607).

Described below is the model updating process for a table model performed in S3606 shown in FIG. 37B.

First, the value of the variable key (that is, the reference name of the update data contained in a request) is analyzed, and the position of the row and the column on the table model is obtained from the above mentioned model-unique position forming the name (S3701).

Then, the setValueAt() method of the model object 3001 is invoked, and the obtained position of the row and the column of the table model, and the value of the update data referenced by the reference name are passed to the method, thereby updating the model object 3001 (S3702) and returning control to the process shown in FIG. 37A.

The above mentioned processes are performed by the framework engine 3003 to update the model object 3001 at the request issued by the browser 3005.

FIG. 38 shows an example of a client server system according to the third embodiment of the present invention.

A server 3010 comprises a model frame work processing unit 3011, a Web server unit 3012, and a back end 3013.

The model frame work processing unit 3011 performs the function corresponding to the framework engine 3003 shown in FIG. 27.

The Web server unit 3012 performs the function of transmitting the HTML sentence generated by the model frame work processing unit 3011 to clients (3020*a*, 3020*b*, 3020*c*, . . . ), and the function corresponding to the front component 3006 accepting a request from the clients (3020*a*, 3020*b*, 3020*c*, . . . ) and passing it to the model frame work processing unit 3011.

The back end 3013 manipulates the data accumulated in a database 3014, and transmits and receives the data to and from the model frame work processing unit 3011 using the model object 3001.

The clients (3020*a*, 3020*b*, 3020*c*, . . . ) are provided with the browser 3005, display the screen based on the HTML sentence transmitted from the server 3010, generates a request corresponding the input to the input form contained on the display screen, and transmits the request to the server 3010.

Described below is a further embodiment of the present invention.

In the embodiment describe below, a process script, which is a logic, can be used when a Web application is developed without making the description invoking the definition of the process script directly in the module defining the view of the screen. Thus, the logic represented by the definition of the process script can be used as parts. Therefore, the logic can be separated from the screen definition. As a result, the reusability of the logic can be enhanced, thereby improving the efficiency of the development of a Web application.

The above mentioned embodiment is referred to as the fourth embodiment to distinguish it from the above mentioned other embodiments.

First, the process shown in FIG. 39 is described. FIG. 39 shows a script generated according to the fourth embodiment of the present invention, and shows that an HTML sentence containing the script indicated in (B) is generated by performing a contents converting process on the description indicated in (A).

The contents of the description of (A) and (B) shown in FIG. 39 indicate that the process script for display of a warning screen notifying that a clicking operation has been performed depending on the clicking operation performed on inputting form parts is performed. For easier explanation, each row in (A) and (B) shown in FIG. 39 starts with a row number.

In the conventional Web application developing method, to allow the browser to perform the block diagram process, it is necessary to directly describe the HTML sentence as shown in (B) in FIG. 39, that is, the property as the condition of invoking the script portion (description in the eighth row of (B) shown in FIG. 39), and the definition of the operation of the process script itself (description in the first through sixth rows of (B) shown in FIG. 39, and also to describe the name (action123( ) in the example of (B) shown in FIG. 39) of the process script in both of them to indicate the relationship between them. Therefore, although it is necessary to amend any of them for any reason, it is necessary to check both of them whether or not the amendment to one of them has an influence on the other, thereby causing the problem in maintenance. Therefore, the definition of the operation of a process script and the portion of invoking the process script are described on the same component, thereby lowering the reusability of the definition of the operation of the process script.

On the other hand, according to the fourth embodiment, a description is made using various tags as shown in (A) in FIG. 39, and the contents converting process is performed on the described sentence to automatically generate an HTML sentence containing the script shown in (B). In (A) shown in FIG. 39, the name is not specified in the process script, or the property indicating the condition of activating the process script (description starting with the 'onclick=' in the eighth row of (B) and specifying the name of the process script) is not described.

Described below is the concept necessary for understanding the description shown in FIG. 39(A).

Figure 40:
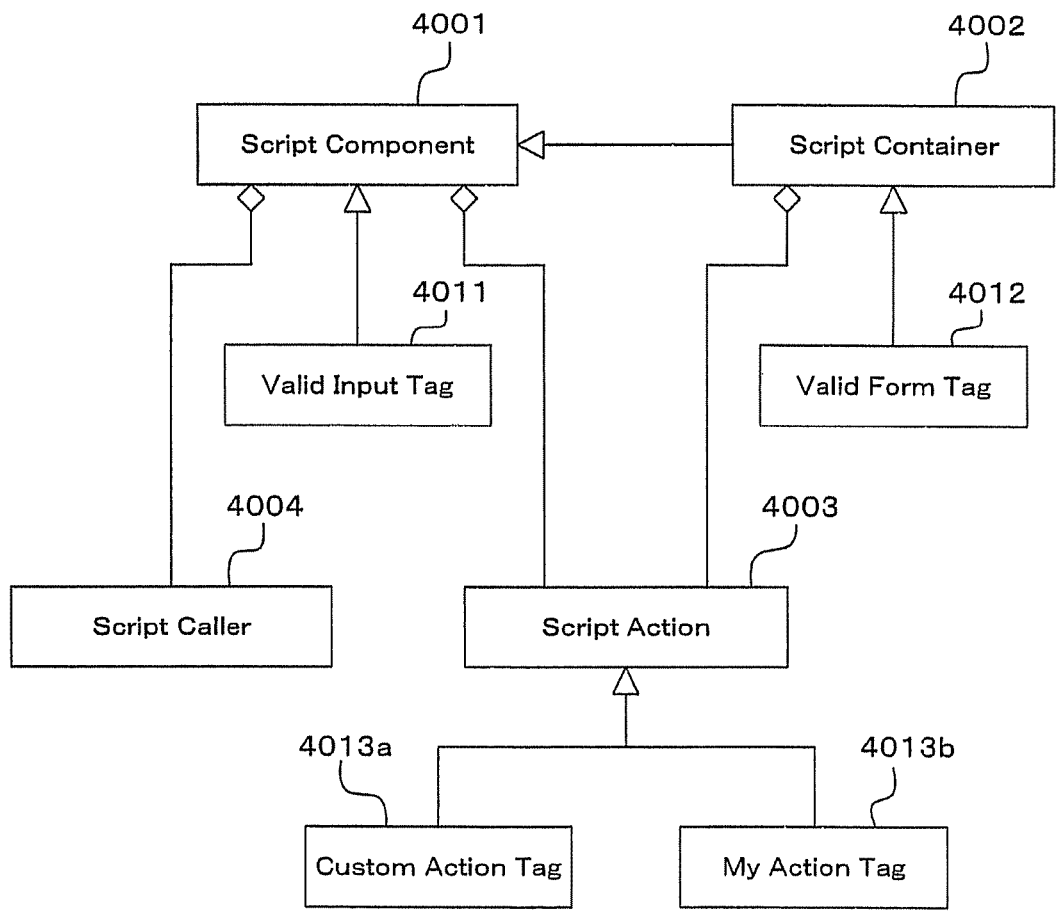
FIG. 40 shows the configuration of an object used in the fourth embodiment of the present invention.

FIG. 40 shows the configuration of the object used in the fourth embodiment of the present invention.

A component (ScriptComponent) object 4001 is an object which is a generation source of an event for an object displayed on the screen by a browser, and an <input> tag (ValidInputTag object 4011) in the example shown in (A) in FIG. 39 is referred to as a component tag. A component tag contains an action tag, and an event, which is the contents of the property described in the action tag, for invoking a process script is specified.

A container (ScriptContainer) object 4002 is an object for management of the component object 4001 and output of a process script contained in an action object 4003, and a <form>tag (ValidFormTag object 4012) in the example in (A) shown in FIG. 39 is referred to as a container tag. The container object 4002 inherits the component object 4001, and can be a generation source of an event.

The action (ScriptAction) object 4003 is an object in which a process, which is a logic, is defined by a script, and the <action> tag in the example in (A) shown in FIG. 39 is referred to as an action tag. An action tag can be either a custom action tag (CustomActiontag object 4013*a*) and a my action tag (MyActiontag object 4013*b*). The details are described later.

A script caller object (ScriptCaller) 4004 is an object for determining the method of invoking each process script performed when a process script is individually invoked depending on the generation of an event, and the method of interpreting the return value.

Figure 41:
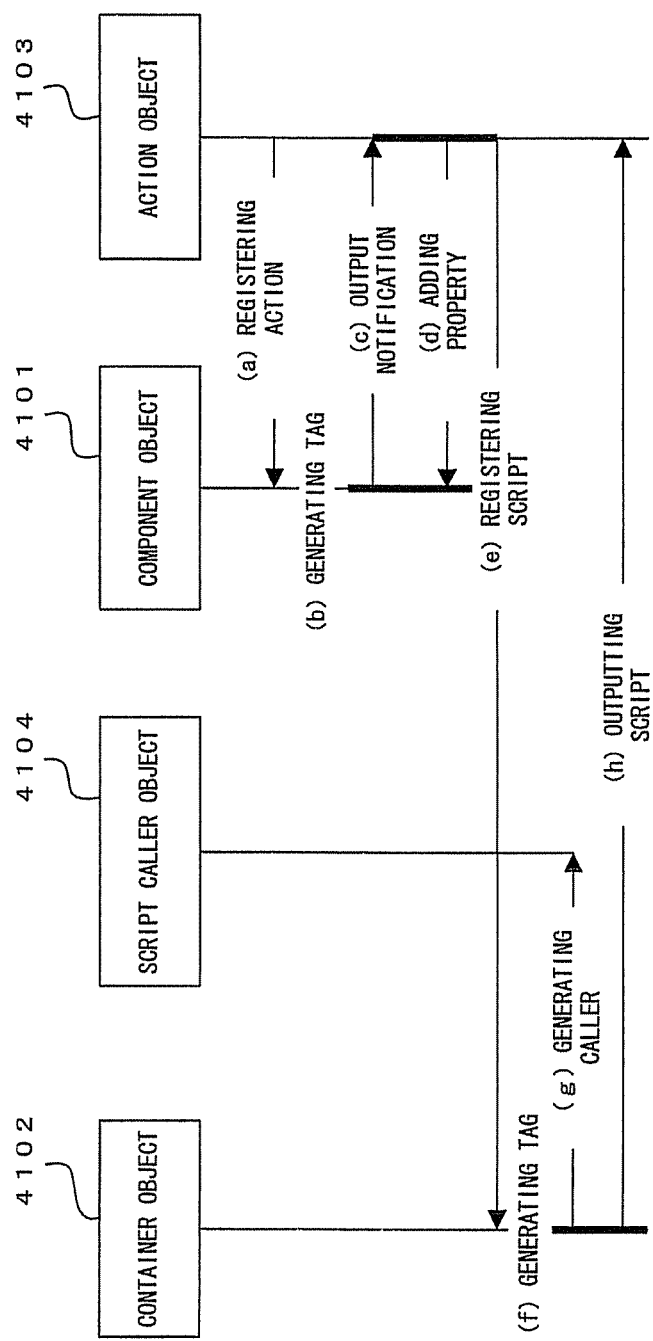
FIG. 41 shows the outline of a contents converting process.

Then, the process shown in FIG. 41 is described below. FIG. 41 shows the outline of the contents converting process. The conversion of the description sentence shown in (A) in FIG. 39 is described by referring to FIG. 41.

The contents of the description of the <form> tag which is a container object 4102 described in the first row of (A) are stored in the storage unit of the processing device for operating the contents converting device, and the contents of the description of the <input> tag which is a component object 4101 described in the second row are similarly stored.

In the third row, an <action> tag which is an action object 4103 is described.

In the <action> tag, an event property is necessarily specified. By specifying the property, it is indicated on what event generated in what component the script described between the <action> tag and the corresponding end tag is performed. In the example in (A), it is indicated that the event of 'clicking operation' generated by the <input> tag in the second row directly including the <action> tag is to be processed.

In the <input> tag in the second row which is the component object 4101, the <action> tag is registered as the action object 4103 of the <input> ((a) shown in FIG. 41).

The script ('alert('clicked!')') described between the <action> tag in the third row and the end tag of the <action> tag in the fifth row (that is, only in the fourth row) is stored as a script performed in the <action> tag which is the action object 4103.

Then, an end tag corresponding to the <input> tag in the second row is described in the sixth row. Then, the generation (that is, the eighth row shown in (B) in FIG. 39) of the <input> tag is started ((b) shown in FIG. 41), and the stored contents (that is, 'input name='field1" in the first row of (A) shown in FIG. 39) about the <input> tag are output.

Then, an output notification is issued to the <action> tag which is the action object 4103 previously registered in the <input> tag ((b) shown in FIG. 41).

When the <action> tag receives the output notification, the contents specified about the above mentioned property are transmitted to the component object 4101, and is added to the <input> tag being generated ((d) shown in FIG. 41). In the example shown in (A) in FIG. 39, the event property is specified as 'click'. Therefore, 'onclick=' is set to be output to the <input> tag. Up to this step of the process, the process of generating the <input> tag by the component object 4101 is almost completed.

Furthermore, the <action> tag which is the action object 4103 holding the above mentioned script is registered in the <form> tag which is the container object 4102 ((e) shown in FIG. 41).

Finally, the end tag corresponding to the <form> tag in the first row is described in the seventh row in (A) shown in FIG. 39. At this time, the generation of the <form> tag which is the container object 4102 is started ((f) shown in FIG. 41), and the first row of (B) shown in FIG. 39 is output.

Then, the generation of the portion invoking the script is indicated by a script caller object 4104 ((g) shown in 41). In this process, the name (action123(target)) of the process script is automatically generated, the second and fifth rows of (B) shown in FIG. 39 are output, and the fourth row in which the return value of the script is output. Furthermore, the name of the process script is output to the <input> tag in the eighth row which is the component object 4101 which is the caller of the process script.

Finally, the above mentioned script is indicated by the <action> tag which is the action object 4103 previously registered in the <form> tag ((h) shown in FIG. 41) is output as the third row of (B) shown in FIG. 39. Afterwards, the sixth, seventh, and ninth rows in (B) shown in FIG. 39 are output by the <form> tag which is the container object 4102, and the generation of the HTML sentence in (B) shown in FIG. 39 is completed.

Figure 42:
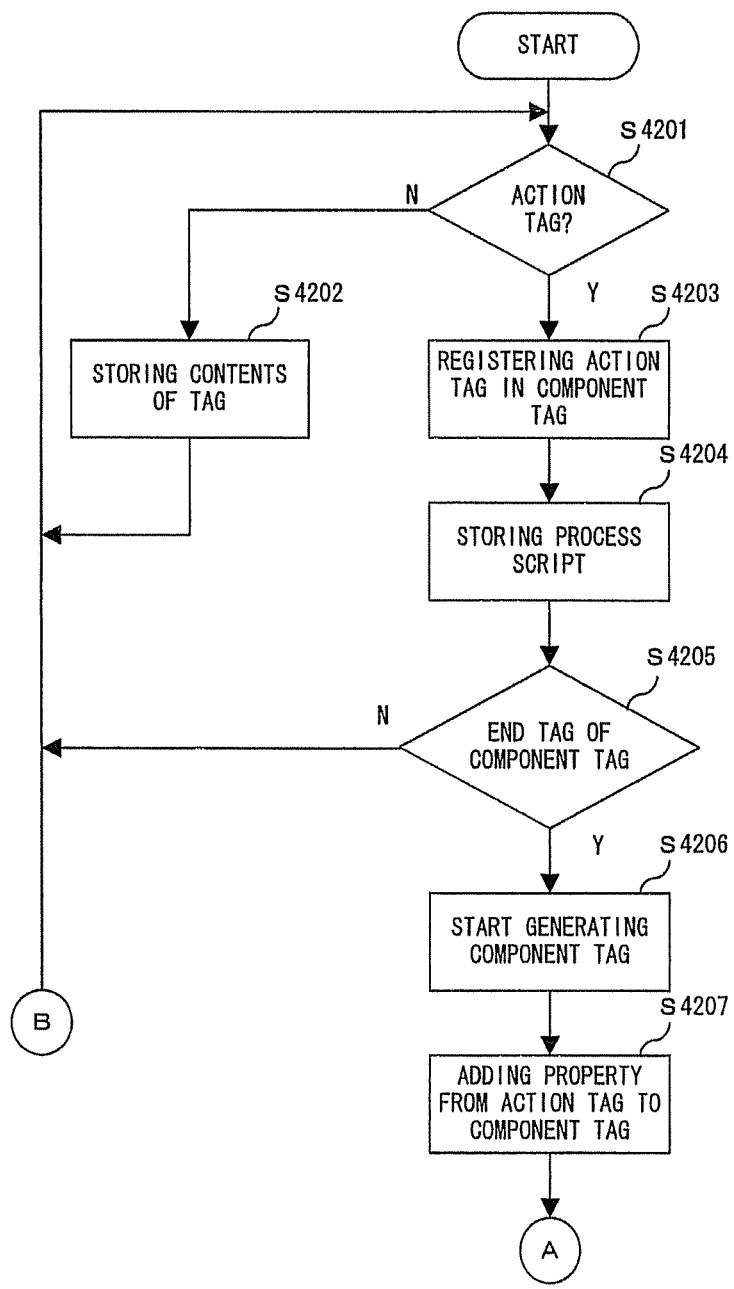
FIG. 42 is a flowchart (1) of the contents of the converting process.

FIGS. 42 and 43 are flowcharts of the above mentioned contents converting process. Described below are the flowcharts.

First, in FIG. 42, when the process starts, the description sentence as shown in (A) in FIG. 39 is read from the start of the row.

It is determined whether or not an action tag is described in the read row (S4201). If there is no action tag (No as the determination result in S4201), the contents of the tag described in this row are stored in the storage unit (S4202), then control is returned to the process in S4201, and the determining process is repeated on the row subsequent to this row.

On the other hand, if an action tag is described in the read row (yes as the determination result in S4201), then the action tag is registered in the component tag containing the action tag (S4203), and the process script described between the start tag and the end tag of the action tag is stored in the storage unit (S4204).

Next, the row subsequent to the row in which the end tag of the action tag is described is read, and it is determined whether or not the end tag of the component tag is described in this row (S4205). As a result, if the end tag of the component tag is not described in this row (no as the determination result of S4205), control is returned to the process in S4201, and the determining process on this row is repeated.

If the end tag of the component tag is described in this row (yes as the determination result of S4205), then the generation of the component tag is started, the contents of the description stored in the storage unit about the component tag are output (S4206), and the property of the action tag registered in the component tag is added (S4207).

Then, control is passed to the process shown in FIG. 43, the contents of the property of the added action tag are checked, and it is determined whether or not the event specified by the property is supported by the component (S4208). As a result, if the specified event is not supported by the component (no as the determination result in S4208), an error notification indicating that an error exists in the original description sentence as a process result of the contents converting process is output (S4209), thereby terminating the process.

On the other hand, if the specified event is supported by the component (yes as the determination result in S4208), the generation of a component tag is completed (S4210), and the generated component tag is temporarily stored in the storage unit. Furthermore, the action tag registered in the component tag is registered in the container tag.

Then, the row subsequent to the row in which the end tag of the component tag is described is read, and it is determined whether or not the end tag of the container tag is describe (S4212). As a result, if the end tag of the container tag is not described in this row (no as a determination result of S4212), then control is returned to the process in S4201 (shown in FIG. 42), and the determining process is repeated on this row.

On the other hand, if the end tag of the container tag is described in this row (yes as the determination result of S4212), then the output about the container tag is output, and the contents of the description stored in the storage unit about the container tag are output (S4213).

Then, the name of the process script is automatically generated and output by the script caller object (S4214). Furthermore, the component tag is associated with the process script by describing the name in the temporarily stored component tag.

Afterwards, the process script described as being associated with the action tag registered in the container tag, and stored in advance in the storage unit is output (S4215), and finally the <script> tag is output, the end tag of the container tag is output, thereby completing the generation of the container tag (S4216).

In the above mentioned processes, the HTML sentence as shown in (B) in FIG. 39 is generated from the description sentence as shown in (A) in FIG. 39.

The contents converting process can be performed by a process engine individually provided by a server, but also can be performed by a framework engine in parallel with the above mentioned displaying process. At this time, the JSP source to be converted in the contents converting process is described as an element of a renderer in a view in which the view of a screen is defined to display a model.

Described below is an application according to the fourth embodiment of the present invention.

In FIG. 39, the script for definition of a process is described in the fourth row of the description sentence (A). However, in the method described below, a process script represented as parts is used without describing it in the description sentence (A).

Figure 44:
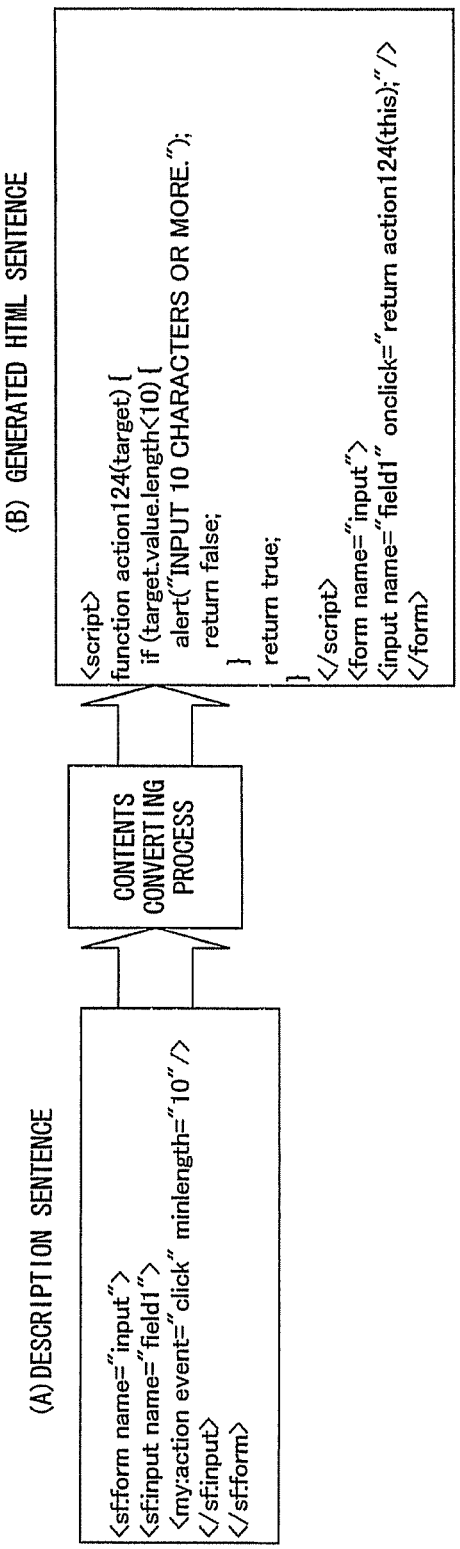
FIG. 44 shows an example of describing a script when a process script is separately prepared.

FIG. 44 shows an example of describing a script when a process script is independently prepared.

In the description sentence shown in (A) in FIG. 39, all tags are assigned sf: as a prefix. However, in the description sentence shown in (A) in FIG. 44, my: is added as a prefix to the action tag <action>. The tag <action> is referred to as a my action tag. When the tag is detected in the contents converting process, a process script prepared in advance is set to be output in the process in S4215 (FIG. 43). On the other hand, the action tag assigned the above mentioned sf: as a prefix is specifically referred to as a custom action tag.

FIG. 45 shows an example of a definition of a process script for checking the smallest number of characters in a character string, which is a script corresponding to the my action tag described in (A) in FIG. 44. In the example of the definition shown in FIG. 45, setMinLength( )for reception of the MinLength property specified in the my action tag is defined, and in the outputFunctionBody method, it is indicated to the output object Writer that a process script embedding the contents of the above mentioned property is to be output.

When the contents converting process shown in FIGS. 42 and 43 is performed, the process script as shown in FIG. 45 is stored in the storage unit in the process in S4204 shown in FIG. 42, and a result of substituting the value for the variable min is output when the process script is output in the subsequent process in S4215 shown in FIG. 43. As a result, the HTML sentence shown in (B) in FIG. 44 is generated from the description sentence of (A) shown in FIG. 44.

Figure 46:
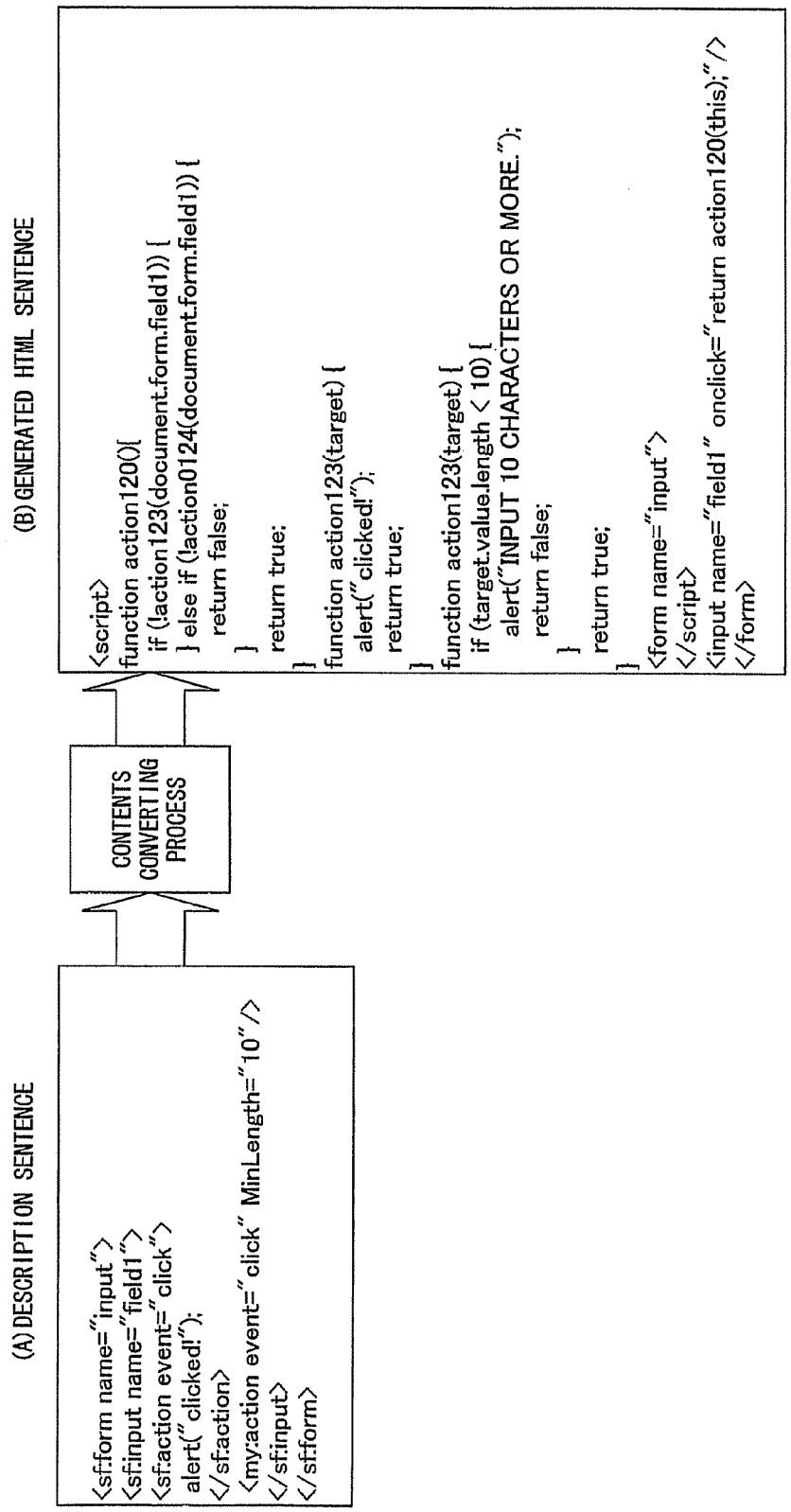
FIG. 46 shows an example of describing a script when a plurality of actions correspond to the same event.

Described below is the process shown in FIG. 46. FIG. 46 shows an example of a description of a script when a plurality of actions correspond to the same event.

In the description sentence of (A) shown in FIG. 46, the <input> tag shown in the second row contains the two action tags in the third and the sixth rows. In this case, in the contents converting process shown in FIGS. 42 and 43, the processes in S4201 through S4205 are performed twice by the operation of the determining process in 54205 shown in FIG. 42. As a result, the two action tags are registered in the <input> tag, and a process script about each action tag is stored.

Then, when a property is added to the <input> tag from the two action tags in the process in S4207 shown in FIG. 42, it is recognized in the contents converting process that the contents of the 'event' specified in the two action tags are the same.

Based on the recognition result, the name of the process script is automatically generated, and simultaneously the process script for sequentially performing the two process scripts shown in the second through eighth rows (portion (a)) of (B) shown in FIG. 46 is automatically generated by the script caller object 4104 in the process in S4214 shown in FIG. 43 in the contents converting process. By the process script automatically generating process performed by the script caller object, the correspondence between the same event and the plurality of process scripts can be established.

Then, in S4215, the data in the ninth through twelfth rows (portion (b)) and in the thirteenth through nineteenth rows (portion (c)) of (B) shown in FIG. 46 is output.

Figure 47:
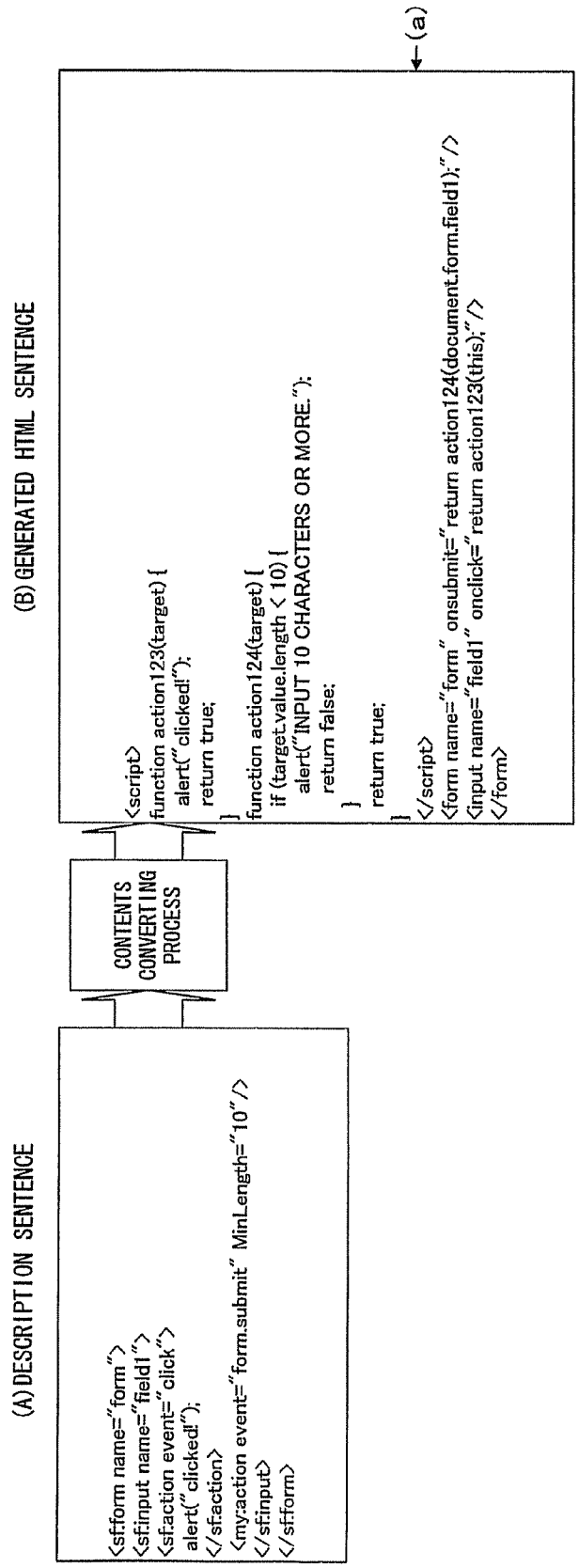
FIG. 47 shows an example of describing a script when an event occurs with a container tag.

Described below is the process shown in FIG. 47. FIG. 47 shows an example of a description of a script when an event occurs by a container tag.

In (A) shown in FIG. 47, in the description of the action tag in the sixth row, an event property is specified in ""form.submit"". The description indicates that the name property is an action tag for the container tag specified in the "form".

For the container tag for which the above mentioned property is specified, an action tag is registered in the process in S4203 shown in FIG. 42 on the container tag instead of the component tag in the contents converting process shown in FIGS. 42 and 43. Furthermore, when the contents of the description about the container tag in the process in S4213 shown in FIG. 43 are output, the process performed on the component tag in S4207 through S4210 is to be performed on the container tag. Thus, the fourteenth row of (B) (portion (a)) shown in FIG. 47 is generated, thereby executing the script on the event generated by the container tag.

Figure 48:
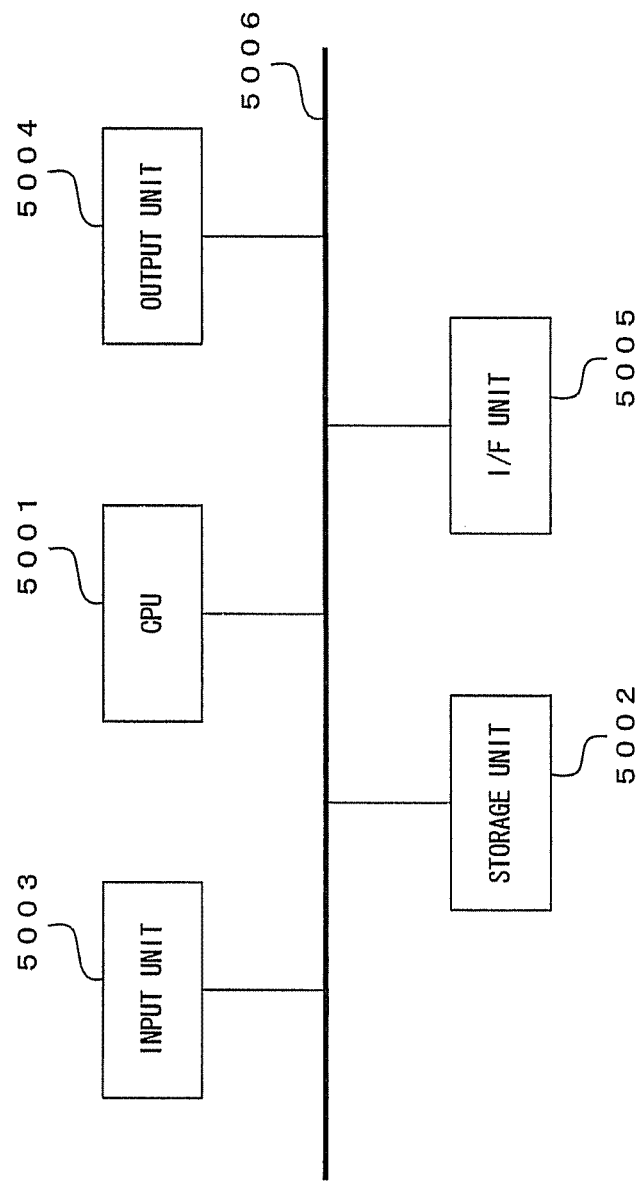
FIG. 48 shows the configuration of each process engine of a server and a client used in a system for realizing each embodiment of the present invention.

FIG. 48 shows the configurations of each process engine of a server and a client used in the system according to each of the above mentioned embodiments of the present invention. Each of them comprises a CPU 5001, a storage unit 5002, an input unit 5003, an output unit 5004, and an I/F unit 5005, which are interconnected through a bus 5006.

The function of each component is described below. The CPU (central processing unit) 5001 controls each component by executing a control program.

The storage unit 5002 is provided with ROM (read-only memory), RAM (random access memory), a magnetic storage device, etc., stores a control program for control of each component by the CPU 5001, and is used as a work area when the CPU 5001 executes the control program or a storage area of various data.

The input unit 5003 includes a mouse, a keyboard, etc., and obtains various data corresponding to the operations of a user.

The output unit 5004 includes a display, etc., and shows various data to a user.

The I/F unit 5005 provides an interface function for connection to a network, and enables data to be communicated with other appliances through a network.

The configuration shown in FIG. 48 is the same as the configuration of a common computer. Therefore, it is obvious that the present invention can also be operated by a common computer.

Figure 49:
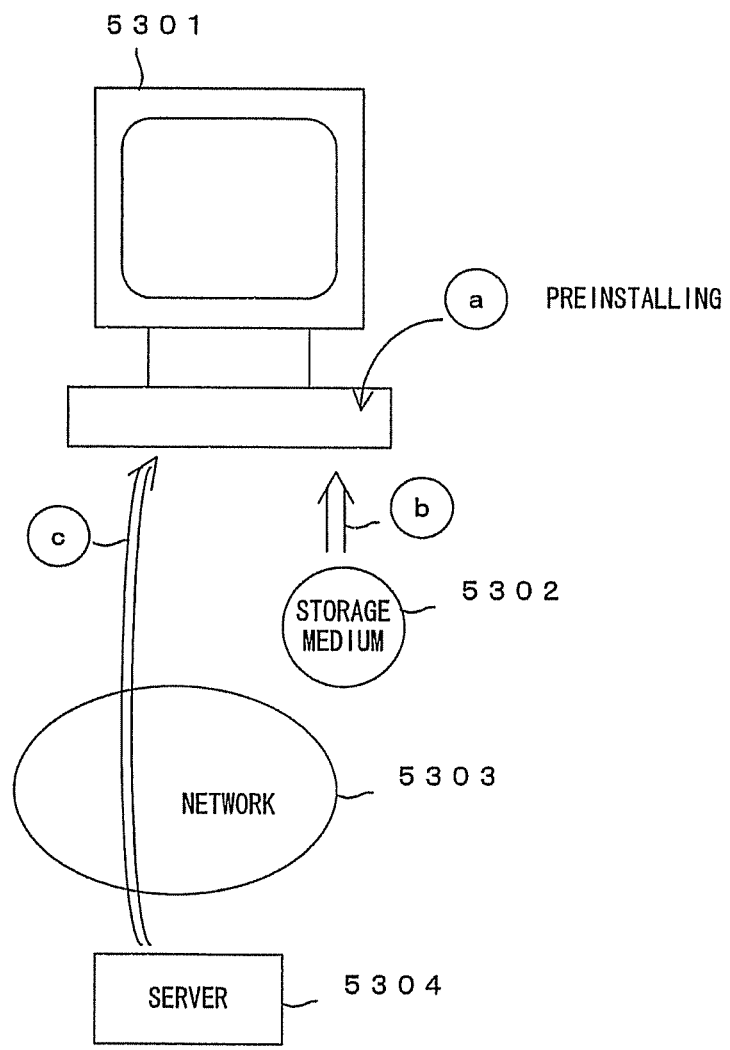
FIG. 49 shows the process of providing a software program, etc. according to the present invention.

FIG. 49 shows the method of providing various software programs executed by an information processing device such as a computer, etc. relating to the present invention. Programs, etc. can be provided in any of the following three methods (a) through (c).

(a) A program is provided after being installed in an information processing device 5301 such as a computer, etc. In this case, the program, etc. is pre-installed before delivery.

(b) A program is provided after being stored in a portable storage medium 5302. In this case, the program, etc. stored in the portable storage medium 5302 is installed in an external storage device of the information processing device 5301 of the computer, etc. An example of the portable storage medium 5302 can be a floppy disk, CD-ROM, an optical magnetic disk, DVD-ROM, etc.

(c) A program is provided by a program providing server 5304 in a network 5303. In this case, basically, the information processing device 5301 such as a computer, etc. obtains the program, etc. by downloading a program, etc. stored in the program providing server 5304. In this case, a transmission signal obtained by modulating a carrier using a data signal representing a system program is transmitted from the program providing server 5304 through the network 5303 which is a transmission medium, and the information processing device 5301 demodulates the received transmission signal to regenerate the software program, thereby successfully executing the software program.

As described above in detail, according to the present invention, the cooperation among the HTML prescribing the screen display, a data object, and a logic prescribing the contents of a process becomes loose in a Web application system, thereby enhancing the reusability of each module and improving the development efficiency and maintenance. In addition, by performing a process with the process in the server dispatched from a larger scope to a smaller scope, a thread safe operation can be realized, a preprocessor and a postprocessor can be added to a process in each scope, and determination can be made before a process or an error process can be flexibly performed.

What is claimed is:

1. An apparatus which is provided on a server side on which various data is transmitted to or received from a client, and generates a document representing a Web page screen indicating data provided for the client, comprising:
    a process logic storage unit storing a process logic defining contents of a process;
    an execution condition storage unit storing an execution condition of the process logic;
    a process logic name generation unit generating a character string which refers to a name of the process logic; and
    a document generation unit generating a document invoking the process logic using the character string to allow a client to invoke and perform the process logic when an event matching the execution condition occurs on a client side.

2. The apparatus according to claim 1, wherein said process logic is defined by a script.

3. The apparatus according to claim 1, wherein said process logic storage unit and said execution condition storage unit respectively store the process logic and the execution condition in a same component for which the process logic and the execution condition are defined.

4. The apparatus according to claim 1, wherein said process logic storage unit stores a plurality of process logics said apparatus further comprises
    a process logic generation unit generating a process logic for sequentially executing the process logics having same execution conditions when any of said plurality of process logics share same execution conditions; and
    said process logic name generation unit generates character strings which refer to different names for the plurality of process logics and a process logic generated by said process logic generation unit; and
    said document generation unit generates a document used when a process logic generated by said process logic generation unit using the character string to allow a client to invoke and execute the process logic when an event matching the same execution condition occurs on the client side.

5. The apparatus according to claim 1, further comprising a confirmation unit confirming validity of correspondence between the process logic and an execution condition of the process logic.

6. An apparatus which is provided on a server side on which various data is transmitted to or received from a client, and generates a document representing a Web page screen indicating data provided for the client, comprising:
    process logic storage means for storing a process logic defining contents of a process;
    execution condition storage means for storing an execution condition of the process logic;
    process logic name generation means for generating a character string which refers to a name of the process logic; and
    document generation means for generating a document invoking the process logic using the character string to allow a client to invoke and perform the process logic when an event matching the execution condition occurs on a client side.

7. A method for generating a document representing a Web page screen indicating data provided for the client on a server side on which various data is transmitted to or received from a client, comprising:
    generating a character string which refers to a name prepared in advance for a process logic whose contents are defined; and
    generating a document invoking the process logic using the character string to allow the client to invoke and perform the process logic when an event matching the execution condition prepared in advance for the process logic occurs on a client side.

8. A non-transitory computer-readable storage medium storing a control program used to direct a computer to control generation of a document representing a Web page screen on which data to be provided for a client is displayed on a server transmitting and receiving various data to and from the client, said control program directing the computer to perform the processes of:
    generating a character string which refers to a name prepared in advance for a process logic whose contents are defined; and
    generating a document invoking the process logic using the character string to allow the client to invoke and perform the process logic when an event matching the execution condition prepared in advance for the process logic occurs on a client side.

* * * * *